United States Patent
Ghule et al.

(10) Patent No.: US 10,887,231 B2
(45) Date of Patent: Jan. 5, 2021

(54) PACKET FRAGMENT FORWARDING WITHOUT REASSEMBLY

(71) Applicant: Juniper Networks, Inc., Sunnyvale, CA (US)

(72) Inventors: Ashish Suresh Ghule, Bangalore (IN); Pankaj Malviya, Bangalore (IN); Jagadish Grandhi, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/983,457

(22) Filed: May 18, 2018

(65) Prior Publication Data

US 2019/0356591 A1 Nov. 21, 2019

(51) Int. Cl.
*H04L 12/28* (2006.01)
*H04L 12/741* (2013.01)
*H04L 12/863* (2013.01)

(52) U.S. Cl.
CPC .......... *H04L 45/745* (2013.01); *H04L 47/625* (2013.01); *H04L 2212/00* (2013.01)

(58) Field of Classification Search
CPC ....... H04L 45/74; H04L 69/22; H04L 45/745; H04L 12/4633; H04L 12/4641
See application file for complete search history.

(56) References Cited

U.S. PATENT DOCUMENTS

| | | | | |
|---|---|---|---|---|
| 2002/0196797 A1* | 12/2002 | Battin | ............ | H04L 69/04 370/410 |
| 2004/0064688 A1* | 4/2004 | Jacobs | ............ | H04L 63/0245 713/150 |
| 2004/0088385 A1* | 5/2004 | Blanchet | ............ | H04L 29/12358 709/220 |
| 2004/0107287 A1* | 6/2004 | Ananda | ............ | H04L 29/1233 709/230 |
| 2006/0039379 A1* | 2/2006 | Abe | ............ | H04L 49/90 370/394 |
| 2007/0195761 A1* | 8/2007 | Tatar | ............ | H04L 49/1546 370/389 |
| 2009/0110003 A1* | 4/2009 | Julien | ............ | H04L 69/166 370/476 |
| 2010/0046522 A1* | 2/2010 | Tatsumi | ............ | H04L 12/4633 370/395.6 |

(Continued)

OTHER PUBLICATIONS

Troan, et al., "Mapping of Address and Port with Encapsulation (MAP-E)," Internet Engineering Task Force (IETF), RFC 7597, Jul. 2015, 35pp.

(Continued)

*Primary Examiner* — Atique Ahmed
(74) *Attorney, Agent, or Firm* — Shumaker & Sieffert, P.A.

(57) ABSTRACT

A network device may forward fragments of an IPv4 network packet to an IPv6 network without reassembling the IPv4 network packet. The network device may receive and buffer one or more fragments of a fragment flow associated with the IPv4 network packet until it receives a fragment of the fragment flow that includes an indication of the destination port of the IPv4 network packet. When the network device receives the fragment that includes the indication of the destination port of the IPv4 network packet, the network device may encapsulate each fragment of the fragment flow that it has received into respective IPv6 network packets to the IPv6 network.

18 Claims, 15 Drawing Sheets

(56) References Cited

U.S. PATENT DOCUMENTS

| | | | | |
|---|---|---|---|---|
| 2011/0110374 | A1* | 5/2011 | Boucadair | H04L 29/12358 370/393 |
| 2011/0261822 | A1* | 10/2011 | Battestilli | H04L 49/3009 370/394 |
| 2012/0246637 | A1* | 9/2012 | Kreeger | H04L 67/1038 718/1 |
| 2014/0307738 | A1* | 10/2014 | Chen | H04L 69/22 370/392 |
| 2015/0201447 | A1* | 7/2015 | Li | H04W 36/0066 455/450 |
| 2016/0050140 | A1* | 2/2016 | Chinni | H04L 47/34 709/242 |
| 2017/0324849 | A1* | 11/2017 | Pfister | H04L 61/2592 |

OTHER PUBLICATIONS

Despres et al. "IPv4 Residual Deployment via IPv6—A Stateless Solution (4rd)," Internet Engineering Task Force (IETF), RFC 7600, Jul. 2015, 45 pp.

Extended European Search Report dated Oct. 10, 2019 in counterpart EP Application No. 19165642.2, 10 pp.

U.S. Appl. No. 16/682,882, filed Nov. 13, 2019, Juniper Networks, Inc. (inventor: Ghule et al.) entitled "Anti-Spoof Check of IPV4-In-IPV6 Fragments Without Reassembly".

Response to Extended European Search Report dated Oct. 10, 2019 from counterpart European Application No. 19165642.0, filed May 20, 2020, 24 pp.

U.S. Appl. No. 16/836,240, filed Mar. 31, 2020, Juniper Networks, Inc. (inventor: Ghule et al.) entitled "IPV6 Flow Label for Stateless Handling of IPV4-Fragments-In-IPV6".

Ziemba et al., "Security Considerations for IP Fragment Filtering," Network Working Group: RFC 1858, Oct. 1995, 10 pp.

Amante et al., "IPv6 Flow Label Specification," Internet Engineering Task Force (IETF), RFC 6437, Nov. 2011, 15 pp.

Carpenter et al., "Using the IPv6 Flow Label for Equal Cost Multipath Routing and Link Aggregation in Tunnels," Internet Engineering Task Force (IETF), RFC 6438, Nov. 2011, 9 pp.

U.S. Appl. No. 16/947,141, filed Jul. 20, 2020, Juniper Networks, Inc. (inventor: Ghule et al.) entitled "IPV6 Extension Header for Stateless Handling of Fragments in IPV6".

* cited by examiner

PACKET FRAGMENT FORWARDING WITHOUT REASSEMBLY

TECHNICAL FIELD

The disclosure relates to packet-based computer networks and, more particularly, to processing packets within network devices.

BACKGROUND

Internet Protocol version 6 (IPv6) is the successor to Internet Protocol version 4 (IPv4), both of which are versions of the Internet Protocol used for sending and receiving data via networks such as the Internet. IPv6 addresses potential issues with IPv4, such as address exhaustion. Networks have begun to transition from IPv4 to IPv6, and IPv6 networks are being deployed alongside IPv4 networks. One example mechanism for facilitating the transition from IPv4 to IPv6 is Mapping of Address and Port with Encapsulation (MAP-E). MAP-E is a mechanism for transporting IPv4 network packets across an IPv6 network using Internet Protocol (IP) encapsulation to encapsulate that IPv4 network packets within IPv6 network packets.

A network device that connects an IPv4 network with an IPv6 network may be able to forward IPv4 network packets from an IPv4 network through an IPv6 network using MAP-E to encapsulate IPv4 network packets within IPv6 network packets. The network device may receive fragments of an IPv4 network packet, reassemble the full IPv4 network packet from the fragments, encapsulate the IPv4 network packet within an IPv6 network packet, and forward the IPv6 network packet to the IPv4 network. The network device may also be able to forward IPv4 network packets that are encapsulated within IPv6 network packets from the IPv6 network to the IPV4 network by decapsulating an IPv4 packet from an IPv6 network packet that encapsulates the IPv4 packet and forwarding the decapsulated IPv4 network packet to the IPv4 network.

SUMMARY

This disclosure describes techniques for forwarding IPv4 network packets to an IPv6 network by receiving fragments of IPv4 network packets and encapsulating fragments of IPv4 network packets within IPv6 network packets without reassembling the IPv4 network packets. Instead, the destination devices of the encapsulated fragments may perform the reassembly of the IPv4 network packets. An IPv4 network packet may use an address plus port technique for packet routing, where the source address specified by an IPv4 network packet can be extended by at least a portion of the source port specified by the IPv4 network packet, and the destination addresses specified by an IPv4 network packet can be extended by at least a portion of the destination port specified by the IPv4 network packet.

Because performing address mapping in accordance with MAP-E may include mapping the destination address and destination port specified by the IPv4 network packet to an IPv6 destination address, a network device cannot perform MAP-E until it has received an indication of both the destination address and destination port. Further, because not every fragment of an IPv4 network packet may include an indication of the destination port specified by the IPv4 network packet, and fragments may be received out of order, the network device may receive one or more fragments that do not include an indication of the destination port before the network device receives a fragment that does include an indication of the destination port. MAP-E is a proposed standard described in Request for Comments (RFC) 7597, the latest draft of which is located at https://tools.ietf.org/html/rfc7597, the entire contents of which is incorporated by reference herein.

In accordance with aspects of this disclosure, a network device may buffer received fragments of IPv4 network packets until receiving a fragment of the IPv4 network packet that includes an indication of the destination port. When the network device receives the fragment of the IPv4 network packet that includes an indication of the destination port, the network device may use MAP-E to map the destination address and the destination port of the IPv4 network packet to an IPv6 destination address, encapsulate each of the received fragments of the IPv4 network packet within an IPv6 network packet, and forward the encapsulated fragments of the IPv4 network packet through the IPv6 network based on the IPv6 destination address. When the network device subsequently receives additional fragments of the IPv4 network packet, the network device may also encapsulate each of the additional fragments of the IPv4 network packet within a respective IPv6 network packet and forward the respective encapsulated additional fragments of the IPv4 network packet through the IPv6 network based on the IPv6 destination address.

The techniques described herein may provide certain advantages. For example, by encapsulating fragments of an IPv4 network packet within IPv6 network packets and forwarding the encapsulated fragments of the IPv4 network packet to an IPv6 network, the techniques described herein may allow a network device to avoid reassembling the entire IPv4 network packet from the fragments of the IPv4 network packet. Because performing reassembly of IPv4 network packets uses processor and memory resources, refraining from reassembling the IPv4 network packet from the fragments of the IPv4 network packet may enable the network device to forward IPv4 network packets to an IPv6 network in a way that uses fewer processor and memory resources. This improves the performance of the network device in forwarding IPv4 network packets to an IPv6 network, by enabling the network device to increase the speed at which it forwards IPv4 network packets to an IPv6 network while expending less processing power and using less memory to perform such forwarding. This also improves the number of fragments that the network device can process by reducing the amount of processor and memory resources used to process fragments, thereby improving the scalability of the network device.

In addition, by forwarding fragments of an IPv4 network packet without reassembling the entire IPv4 network packet from the fragments, the techniques disclosed herein may avoid having to re-fragment the reassembled IPv4 network packet, thereby reducing the amount of processing that is performed by the network device. For example, an IPv6 network packet that encapsulates a reassembled IPv4 network packet will be larger in size than an IPv6 network packet that encapsulates a fragment of the IPv4 network packet. Thus, the IPv6 network packet that encapsulates the reassembled IPv4 network packet may be more likely to exceeds a maximum transmission unit (MTU) of one or more links of the IPv6 network. If the IPv6 network packet that encapsulates the reassembled IPv4 network packet exceeds the MTU of one or more links of the IPv6 network, it may be necessary to fragment the reassembled IPv4 network packet in order to forward the IPv4 network packet to the IPv6 network.

This disclosure also describes techniques for forwarding fragments of IPv4 network packets encapsulated within IPv6 network packets to an IPv4 network and performing anti-spoofing checks of such network packets without reassembling IPv4 network packets from its fragments encapsulated within IPv6 network packets. A network device may perform an anti-spoof check on fragments of an IPv4 network encapsulated within an IPv6 network packet based at least in part on the source address and the source port specified by the IPv4 network packet. As such, a network device cannot perform an anti-spoof check of an IPv4 network packet until the network device has received an indication of both the source address and source port. Further, because not every fragment of an IPv4 network packet may include an indication of the source port specified by the IPv4 network packet, and because fragments may be received out of order, the network device may receive one or more fragments encapsulated within IPv6 network packets that do not include an indication of the source port before the network device receives a fragment that includes an indication of the source port. These techniques provide similar advantages as discussed above with respect to encapsulating fragments of IPv4 network packets without reassembly.

In accordance with aspects of this disclosure, a network device may receive IPv6 network packets that carry fragments of IPv4 network packets, decapsulate the fragments from the IPv6 network packets, and buffer the fragments until the network device receives an IPv6 network packet carrying a fragment of the IPv4 network packet that includes an indication of the source port. When the network device receives the IPv6 network packet that carries the fragment of the IPv4 network packet that includes an indication of the source port, the network device may perform an anti-spoof check of the IPv4 network packet based at least in part on the source address and the source port of the IPv4 network packet. If the IPv4 network packet passes the anti-spoof check, the network device may forward each of the fragments that it has received to the IPv4 network, and may forward any additional fragments that it subsequently receives to the IPv4 network. If the IPv4 network packet fails the anti-spoof check, the network device may drop each of the received fragments for the IPv4 network packet, and may also drop any subsequently received fragments for the IPv4 network packet.

The techniques described herein may provide certain advantages. For example, the techniques described herein may allow a network device to avoid reassembling the entire IPv4 network packet from the fragments of the IPv4 network packet in order to perform an anti-spoof check on the network packet. Because performing reassembly of IPv4 network packets uses processor and memory resources, refraining from reassembling the IPv4 network packet from the fragments of the IPv4 network packet may enable the network device to perform anti-spoof checks on IPv4 network packets in a way that uses fewer processor and memory resources. This improves the performance of the network device in perform anti-spoof checks on IPv4 network packets, by enabling the network device to increase the speed at which it performs anti-spoof checks on IPv4 network packets while expending less processing power and using less memory to perform such anti-spoof checks.

In one example, the disclosure is directed to a method. The method includes receiving, by a network device from a first network, one or more fragments of a fragment flow associated with a network packet, wherein the network packet is a first type of network packet. The method further includes in response to determining that the network device has not yet received a fragment of the fragment flow that includes an indication of a destination port for the network packet, buffering, by the network device, the one or more fragments. The method further includes receiving, by the network device, the fragment of the fragment flow that includes the indication of the destination port of the network packet. The method further includes in response to receiving the fragment of the fragment flow that includes the indication of the destination port of the network packet, encapsulating, by the network device, the one or more fragments of the fragment flow and the fragment of the fragment flow within a plurality of network packets based at least in part on the destination port of the network packet without reassembling the network packet from the one or more fragments and the fragment, wherein the plurality of network packets are each a second type of network packet. The method further includes dispatching, by the network device to a second network, the plurality of network packets.

In another example, the disclosure is directed to a network device. The network device includes one or more network interfaces configured to receive, from a first network, one or more fragments of a fragment flow associated with a network packet, wherein the network packet is a first type of network packet. The network device further includes one or more processors configured to, in response to determining that the network device has not yet received a fragment of the fragment flow that includes an indication of a destination port for the network packet, buffering the one or more fragments in a fragment buffer. The one or more network interfaces are further configured to receive the fragment of the fragment flow that includes the indication of the destination port of the network packet from the first network. The one or more processors are further configured to, in response to the one or more network interfaces receiving the fragment of the fragment flow that includes the indication of the destination port of the network packet, encapsulate the one or more fragments of the fragment flow and the fragment of the fragment flow within a plurality of network packets based at least in part on the destination port of the network packet without reassembling the network packet from the one or more fragments and the fragment, wherein the plurality of network packets are each a second type of network packet. The one or more network interfaces are further configured to dispatch the plurality of network packets to a second network.

In another example, the disclosure is directed to a method. The method includes receiving, by a network device from a first network, one or more network packets of a first network packet type, wherein each of the one or more network packets encapsulate a respective one of one or more fragments of a fragment flow associated with a network packet of a second network packet type. The method further includes in response to determining that the one or more network packets of the fragment flow does not include a fragment of the fragment flow that includes an indication of a source port of the network packet, buffering, by the network device, the one or more fragments of the fragment flow. The method further includes receiving, by the network device, a network packet of the first network type that encapsulates the fragment of the fragment flow that includes the indication of the source port of the network packet. The method further includes in response to receiving the network packet of the first network type that encapsulates the fragment of the fragment flow that includes the indication of the source port of the network packet, performing, by the network device, an anti-spoof check on the one or more fragments of the fragment flow and the fragment of the fragment flow based at least in part on the source port of the network packet of the second network packet type without reassembling the network packet of the second network packet type from the one or more fragments of the fragment flow and the fragment of the fragment flow. The method further includes in response to the one or more fragments of the fragment flow and the fragment of the fragment flow passing the anti-spoof check, dispatching, by the network device to a second network, the one or more fragments of the fragment flow and the fragment of the fragment flow.

In another example, the disclosure is directed to a network device. The network device includes one or more network interfaces configured to receive, from a first network, one or more network packets of a first network packet type, wherein each of the one or more network packets encapsulate a respective one of one or more fragments of a fragment flow associated with a network packet of a second network packet type. The network device further includes one or more processors configured to, in response to determining that the one or more network packets of the fragment flow does not include a fragment of the fragment flow that includes an indication of a source port of the network packet, buffer the one or more fragments of the fragment flow in a fragment buffer. The one or more network interfaces are further configured to receive a network packet of the first network type that encapsulates the fragment of the fragment flow that includes the indication of the source port of the network packet. The one or more processors are further configured to, in response to the one or more network interfaces receiving the network packet of the first network type that encapsulates the fragment of the fragment flow that includes the indication of the source port of the network packet, perform an anti-spoof check on the one or more fragments of the fragment flow and the fragment of the fragment flow based at least in part on the source port of the network packet of the second network packet type without reassembling the network packet of the second network packet type from the one or more fragments of the fragment flow and the fragment of the fragment flow. The one or more network interfaces are further configured to, in response to the one or more fragments of the fragment flow and the fragment of the fragment flow passing the anti-spoof check, dispatch the one or more fragments of the fragment flow and the fragment of the fragment flow to a second network.

The details of one or more techniques of the disclosure are set forth in the accompanying drawings and the description below. Other features, objects, and advantages of the techniques will be apparent from the description and drawings, and from the claims.

DETAILED DESCRIPTION

Figure 1:
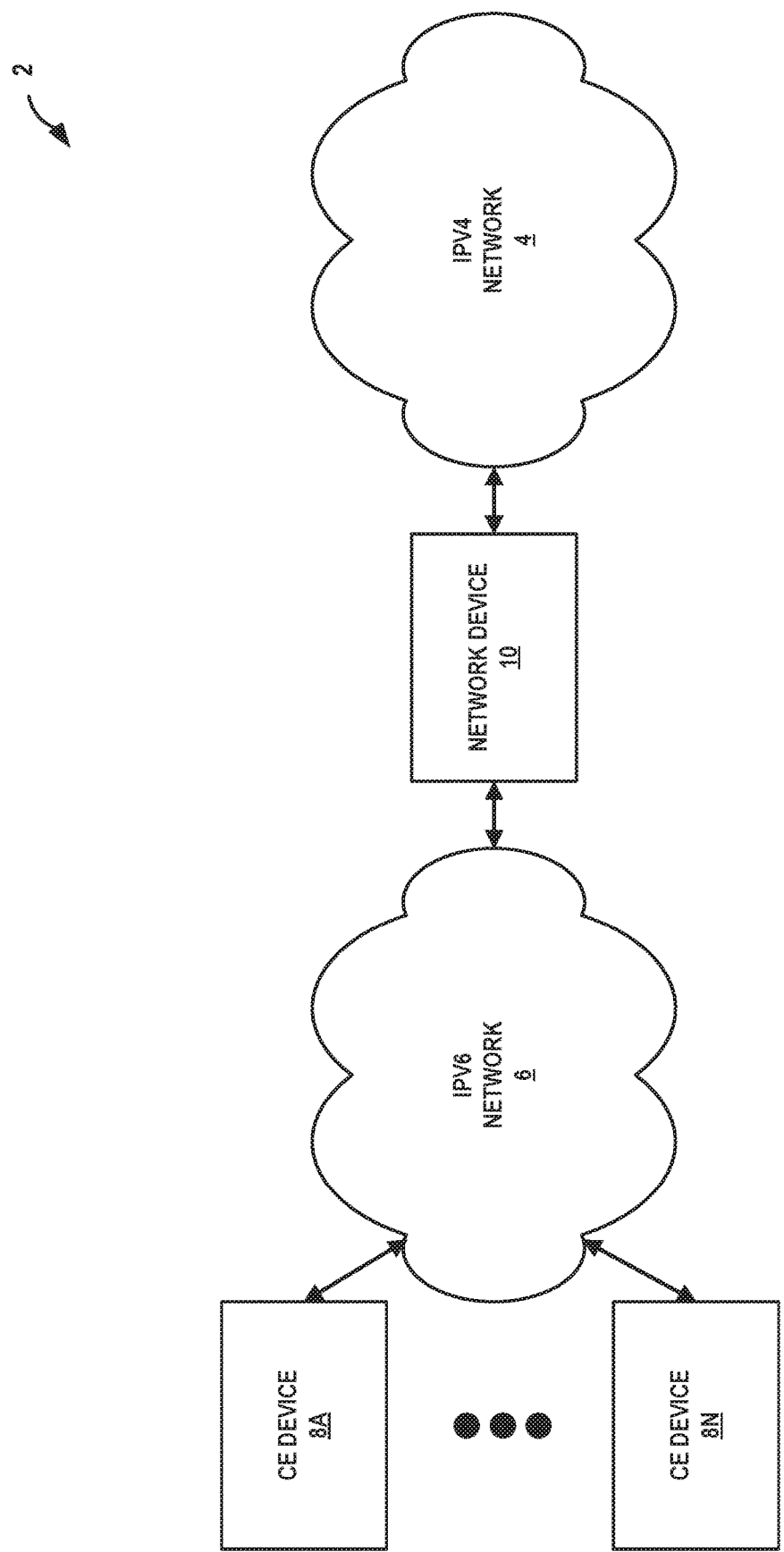
FIG. 1 is a block diagram illustrating a system in which a network device may connect an IPv4 network to an IPv6 network, according to techniques described herein.

FIG. 1 is a block diagram illustrating a system 2 in which a network device 10 may connect an IPv4 network 4 to an IPv6 network 6, according to techniques described herein. Network device 10 may be, for example, a MAP-E enabled router (e.g., a MAP border relay) managed by a service provider at the edge of a MAP domain, having at least one IPv6 enabled interface connecting network device 10 to IPv6 network 6, and at least one IPv4 interface connecting network device to IPv4 network 4. In some examples, some or all of system 2 may be part of a service provider network (not shown).

As shown in FIG. 1, network device 10 may receive IPv4 network packets from IPv4 network 4, encapsulate the IPv4 network packets into IPv6 network packets, and may forward the encapsulated IPv6 network packets through IPv6 network 6. In this example, IPv6 network 6 may also include customer edge (CE) devices 8A-8N ("CE devices 8") to which the encapsulated IPv6 network packets are forwarded. CE devices 8 may be devices that function as customer edge routers in a MAP deployment. For example, one or more of CE devices 8 may serve a residential site with one wide area network-side interface and one or more local area network-side interfaces. In some examples, IPv6 network 6 may be a private network or a service provider network while IPv4 network 4 may be a public network (e.g., the Internet). In some examples, network device 10, IPv6 network 6, and CE devices 8 may form a MAP domain. In some examples, network device 10 may also receive IPv6 network packets that encapsulate IPv4 network packets from IPv6 network 6, such as from CE devices 8, perform anti-spoofing checks on the IPv6 network packets, and, if the IPv6 network packets pass the anti-spoofing checks, forward the IPv4 network packets encapsulated within the IPv6 network packets to IPv4 network 4. In some examples, network device 10 and CE devices 8 may each be dual stacked devices in that they can interoperate equally with IPv4 devices, IPv6 devices, and other dual stacked devices. For example, CE devices 8 may interact with network device 10 via IPv6 network 6, but may also be operably connected to an IPv4 network to forward IPv4 network packets to IPv4 devices.

An IPv4 network packet may use an address plus port technique for packet routing, where the IPv4 destination address specified by an IPv4 network packet can be extended by at least a portion of the destination port specified by the IPv4 network packet. To route an IPv4 network packet through IPv6 network 6 to its intended destination, network device 10 may encapsulate an IPv4 network packet that it receives from IPv4 network 4 within an IPv6 network packet. Network device 10 may perform Mapping of Address and Port with Encapsulation (MAP-E) to map the IPv4 destination address and destination port specified by the IPv4 network packet to an IPv6 destination address, and to encapsulate the IPv4 network packet within an IPv6 network packet that specifies the IPv6 destination address, so that the IPv6 network packet may be routed through IPv6 network 6 to its intended destination.

Network device 10 may receive an IPv4 network packet in the form of fragments, where each fragment includes a portion of the IPv4 network packet. To forward the fragments of the IPv4 network packet through IPv6 network 6 to its intended destination specified by the IPv4 destination address and at least a portion of the destination port specified by the IPv4 network packet, network device 10 may perform MAP-E to determine the corresponding IPv6 destination address based at least in part on the IPv4 destination address and the destination port specified by the IPv4 network packet, encapsulate each of the fragments in an IPv6 network packet, based at least in part on the IPv6 network address, and forward each of the encapsulated fragments through IPv6 network 6 to the intended destination specified by the IPv6 network address.

Because performing MAP-E includes mapping the IPv4 destination address and destination port specified by the IPv4 network packet to an IPv6 destination address, network device 10 may not be able to encapsulate the IPv4 network packet into IPv6 network packets and forward the IPv6 network packets until it receives indications of the destination address and the destination port specified by the IPv4 network packet. While each fragment of the IPv4 network packet includes an indication of the destination address of the IPv4 network packet, not every fragment of the IPv4 network packet may include an indication of the destination port of the IPv4 network packet. In some examples, only a single fragment of the IPv4 network packet may include an indication of the destination port of the IPv4 network packet.

In accordance with some aspects of the present disclosure, network device 10 may receive fragments of an IPv4 network packet that do not include an indication of the destination port, and may buffer the received fragments of the IPv4 network packet in a buffer until network device 10 receives a fragment of the IPv4 network packet that includes an indication of the destination port specified by the IPv4 network packet. When network device 10 receives the fragment of the IPv4 network packet that includes the indication of the destination port, network device 10 may encapsulate each of the fragments that have been received by network device 10 in an IPv6 network packet based at least in part on the IPv4 destination address and the destination port specified by the IPv4 network packet, and may forward the encapsulated network packets through IPv6 network 6. When network device 10 receives additional fragments of the IPv4 network packet after receiving the fragment of the IPv4 network packet that includes the indication of the destination port, network device 10 may encapsulate those fragments in IPv6 network packets, and may forward the encapsulated network packets through IPv6 network 6 without buffering the additional fragments in the buffer or reassembling the IPv4 network packet based at least in part on the additional fragments.

Network device 10 may also forward IPv4 network packets that have been encapsulated in IPv6 network packets from IPv6 network 6 to IPv4 network 4 and route the IPv4 network packets through IPv4 network 4 to its intended destination. In particular, network device 10 may receive, from IPv6 network 6, IPv6 network packets that encapsulate fragments of an IPv4 network packet that is to be forwarded to IPv4 network 4. To prevent spoofing of IPv4 addresses, network device 10 may perform an anti-spoof check on the fragments of the IPv4 network packet that it receives in the form of IPv6 network packets that encapsulate fragments of the IPv4 network packet. Network device 10 may buffer fragments of the IPv4 network packet until it has received information associated with the IPv4 network packet that enables it to perform the anti-spoofing check on fragments of the IPv4 network packet.

Network device 10 may perform the anti-spoof check on fragments of an IPv4 network packet that are embedded within IPv6 network packets based at least in part on the IPv4 source address and the source port specified by the fragments of the IPv4 network packet. However, not every fragment of the IPv4 network packet may include an indication of the source port of the IPv4 network packet. In some examples, only a single fragment of the IPv4 network packet may include an indication of the source port of the IPv4 network packet.

In accordance with some aspects of the present disclosure, network device 10 may receive one or more IPv6 network packets that encapsulate a respective one or more fragments of an IPv4 network packet that do not include an indication of the source port of the IPv4 network packet, and may decapsulate and buffer the received fragments of the IPv4 network packet until network device 10 receives an IPv6 network packet that encapsulates a fragment of the IPv4 network packet that does include an indication of the source port of the IPv4 network packet. When network device 10 receives the fragment of the IPv4 network packet that includes the indication of the source port, network device 10 is able perform an anti-spoof check of the fragments of the IPv4 network packet received by network 10 based at least in part on the source address and the source port without reassembling the IPv4 network packet from its fragments.

If the fragments IPv4 network packet received by network device 10 passes the anti-spoof check, network device 10 may forward the IPv4 network packet fragments it has received to IPv4 network 4, and may forward any remaining fragments of the IPv4 network packet that it receives to IPv4 network 4. Conversely, if the fragments of the IPv4 network packet do not pass the anti-spoof check, network device 10 may drop the fragments of the IPv4 network packet it has received, and may drop any remaining fragments of the IPv4 network packet that it receives.

Figure 2:
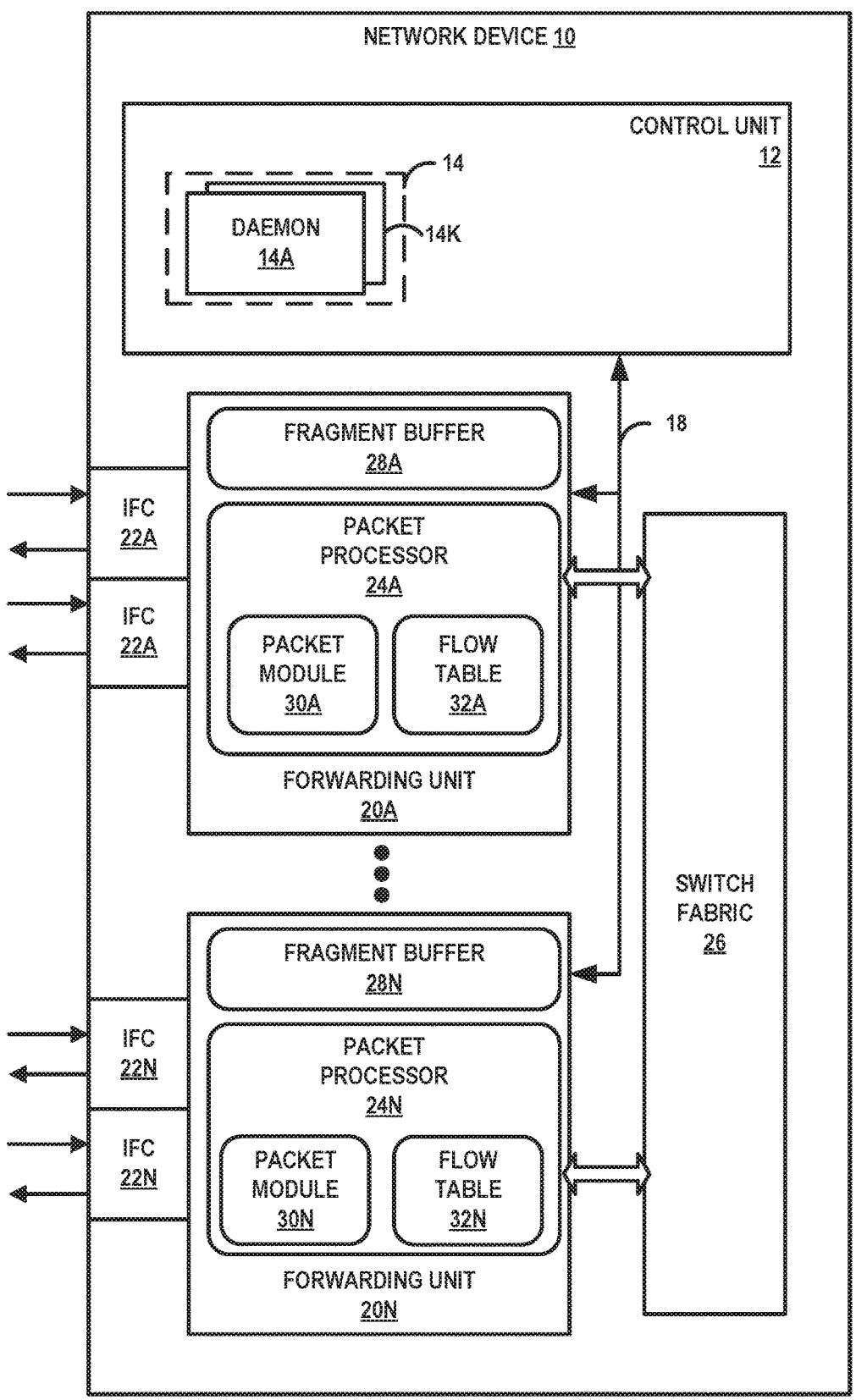
FIG. 2 is a block diagram illustrating an example network device 10 that is configured to encapsulate fragments of IPv4 network packets in IPv6 packets without reassembling the IPv4 network packets, and to perform anti-spoofing checks on fragments of IPv4 network packets without reassembling the IPv4 network packets from its fragments, according to techniques described herein.

FIG. 2 is a block diagram illustrating an example network device 10 that is configured to encapsulate fragments of IPv4 network packets in IPv6 packets without reassembling the IPv4 network packets, and to perform anti-spoofing checks on fragments of IPv4 network packets without reassembling the IPv4 network packets from its fragments, according to techniques described herein. Network device 10 may include a router such as a provider edge or customer edge router, a core router, or another type of network device, such as a switch. In some examples, network device is a MAP border relay router. In this example, network device 10 includes a control unit 12 that provides control plane functionality for the device. Network device 10 also includes a plurality of forwarding units 20A-20N ("forwarding units 20") and a switch fabric 26 that together provide a data plane for processing network traffic.

Forwarding units 20 receive and send data packets via interfaces of interface cards 22A-22N ("IFCs 22") each associated with a respective one of forwarding units 20. Each of forwarding units 20 and its associated ones of IFCs 22 may represent a separate line card insertable within a chassis (not shown) of network device 10. IFCs 22 may be referred to throughout this disclosure as one or more network interfaces. Example line cards include flexible programmable integrated circuit (PIC) concentrators (FPCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 20 may include more or fewer IFCs. Switch fabric 26 provides a high-speed interconnect among forwarding units 20 for forwarding incoming data packets to an egress forwarding unit of forwarding units 20 for output over a network that includes network device 10.

Control unit 12 is connected to each of forwarding units 20 by internal communication links 18. Internal communication links 18 may include a 100 Mbps Ethernet connection, for instance. Control unit 12 configures, by sending instructions and other configuration data via internal communication link 18, forwarding units 20 to define control processing operations applied to packets received by forwarding units 20.

Control unit 12 executes a plurality of applications, including daemons 14A-14K ("daemons 14"). Each of the applications may represent a separate process managed by a control unit operating system. Daemons 14 may represent user-level processes that are developed and deployed by the manufacturer of the network device 10. As such, daemons 14 are "native" to the network device 10 in that the development of the applications is carefully managed by the manufacturer to facilitate secure, robust, and predictable operation of the network device 10, such operation defined at least in part according to a configuration specified by an operator (e.g., a service provider, enterprise, or other customer of the network device 10 manufacturer). Daemons 14 may run network management software, execute routing protocols to communicate with peer routing devices, maintain and update one or more routing tables, and create one or more forwarding tables for installation to forwarding units 20, among other functions.

Control unit 12 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 20 includes at least one fragment buffer 28 that stores fragments of network packets, such as fragments of IPv4 network packets on which network device 10 may perform one or more operations. Fragment buffer 28 may be any appropriate data store for storing fragments of network packets, and may be embodied upon any appropriate computer readable storage medium, such as memory, storage disks, and the like. For example, fragment buffer 28A of forwarding unit 20A may be memory that stores fragments received via IFC 22A. Packet processor 24A of forwarding unit 24A may perform one or more operations on the fragments stored in fragment buffer 28A and may output the fragments stored in fragment buffer 28A via IFC 22A. In some examples, fragment buffer 28 may be reassembly buffers of network 10 that has typically been used by network device 10 to store fragments of IPv4 network packets that it is to reassemble to form a whole IPv4 network packet that network device 10 may encapsulate within an IPv6 network to send to IPv6 network 6, or to reassemble the IPv4 network packet to perform an anti-spoof check on the IPv4 network packet. However, the techniques disclosed in this disclosure may be able to perform one or more operations on the fragments stored in fragment buffer 28 without reassembling an IPv4 network packet from the fragments stored in fragment buffer 28.

Each forwarding unit of forwarding units 20 includes at least one packet processor 24 that processes packets by performing a series of operations on each packet over respective internal packet forwarding paths as the packets traverse the internal architecture of network device 10. Packet processor 24A of forwarding unit 20A, for instance, includes one or more configurable hardware chips (e.g., a chipset) that, when configured by applications executing on control unit 12, define the operations to be performed by packets received by forwarding unit 20. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 20 may include one or more packet processors 24.

Operations may be performed, for example, on each packet by any of a corresponding ingress interface, an ingress forwarding unit 20, an egress forwarding unit 20, an egress interface or other components of network device 10 to which the packet is directed prior to egress, such as one or more service cards. Packet processors 24 process packets to identify packet properties and perform actions bound to the properties. Each of packet processors 24 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. The result of packet processing determines the manner in which a packet is forwarded or otherwise processed by packet processors 24 of forwarding units 20 from its input interface on one of IFCs 22 to, at least in some cases, its output interface on one of IFCs 22.

Packet processors 24 include respective packet modules 30A-30N ("packet module 30") that execute at packet processors 24 to receive fragments of IPv4 network packets from IPv4 network 4 via IFCs 22, encapsulate individual fragments of an IPv4 network packet within individual IPv6 network packets according to MAP-E, and forward each the IPv6 network packets via IFCs 22 to IPv6 network 6 without reassembling the IPv4 network packet from its fragments.

The set of fragments of an IPv4 network packet that is received by network device 10, via IFCs 22, is referred to herein as a fragment flow, where every fragment of a particular IPv4 network packet is part of the same fragment flow associated with the IPv4 network packet. Packet module 30 may forward the fragments of an IPv4 network packet that network device 10 receives from IPv4 network 4 to IPv6 network 6 by performing MAP-E to determine an IPv6 destination address and to create an IPv6 network packets based at least in part on the IPv6 destination address to encapsulate each fragment of the fragment flow. Packet module 30 may forward the IPv6 network packets that encapsulate the fragments of the fragment flow to IPv6 network 6 via IFCs 22.

Packet module 30 may determine the IPv6 destination address based at least in part on the IPv4 destination address and destination port specified by the fragments of the fragment flow. However, only a single fragment of the fragment flow for an IPv4 network packet may include an indication the destination port of the IPv4 network packet. Thus, when packet module 30 encounters fragments of the fragment flow that do not include an indication of the destination port of the IPv4 network packet, packet module 30 is unable to perform MAP-E to determine the IPv6 destination address from the IPv4 destination address and the destination port of the IPv4 network packet, and packet module 30 is thus also unable to create IPv6 network packets to encapsulate the fragments of the fragment flow.

Instead, in accordance with the techniques of this disclosure, packet module 30 may buffer the fragments of a fragment flow for an IPv4 network packet it receives in fragment buffer 28 in the order in which the fragments were received at network device 10 until packet module 30 receives, via IFCs 22, the fragment of the fragment flow that includes an indication of the destination port of the IPv4 network packet. When packet module 30 receives, via IFCs 22, the fragment of the fragment flow for the IPv4 network packet that includes an indication of the destination port for the IPv4 network packet, packet module 30 may be able to perform MAP-E to encapsulate the fragments of the fragment flow within IPv6 network packets based at least in part on the destination address of the IPv4 network packet and to dispatch the IPv6 network packets to IPv6 network 6, without requiring network device 10 to reassemble the IPv4 network packet.

As part of performing MAP-E, packet module 30 determines the IPv6 destination address from the IPv4 destination address and the destination port. Packet module 30 may also create IPv6 network packets based at least in part on the IPv6 destination address and encapsulate each fragment of the fragment flow it has received (i.e., the fragments of the fragment flow currently being buffered in fragment buffer 28 and the fragment of the fragment flow that includes an indication of the destination port) within a respective IPv6 network packet it has created. Packet module 30 may forward the IPv6 network packets to IPv6 network 6 for routing to an intended destination according to the IPv6 destination address.

When packet module 30 receives one or more additional fragments of the fragment flow for the IPv4 network packet after it has received the fragment of the fragment flow that includes an indication of the destination port for the IPv4 network packet, packet module 30 is able to perform MAP-E to encapsulate the one or more additional fragments of the fragment flow within respective one or more IPv6 network packets without buffering the one or more additional fragments of the fragment flow in fragment buffer 28, and to forward the one or more IPv6 network packets to IPv6 network 6. In this way, packet module 30 is able to forward fragments of an IPv4 network packet from IPv4 network 4 to IPv6 network 6 without reassembling the IPv4 network packet from its fragments.

Packet processor 24 may also include or otherwise be able to access flow tables 32A-32N ("flow table 32") that includes entries associated with fragment flows encountered by packet module 30. Flow table may be any suitable data structures or data stores that stores information associated with fragment flows processed by packet module 30, and may be embodied upon any suitable computer readable storage medium.

When packet module 30 initially encounters a fragment of a fragment flow from an IPv4 network 4 for forwarding to IPv6 network 6, packet module 30 may create an entry for the fragment flow in flow table 32. When packet module 30 has finished processing all fragments of the fragment flow, packet module 30 may delete the entry for the fragment flow from flow table 32. The entry for the fragment flow may store various information associated with the fragment flow that may be used by packet module 30 to process fragments of the fragment flow. In particular, packet module 30 may use the information stored in the entry for the fragment flow to determine whether to buffer fragments of the fragment flow received by network device 10 in to fragment buffer 28, or whether to encapsulate and forward fragments of the fragment flow received by network device 10.

The entry for a fragment flow in flow table 32 may include or otherwise be associated with a key that may be used to index into flow table 32 to look up and locate the entry in flow table 32 for a particular fragment flow entry. The key for an entry in flow table 32 for a fragment flow associated with an IPv4 network packet may be generated, such as via hashing, based at least in part on the following values specified by an IPv4 network packet header included in each fragment of the fragment flow: a fragment identifier, an IPv4 source address, an IPv4 destination address, and a protocol identifier.

The fragment identifier is a value, such as an integer, that is the same for each fragment of the fragment flow, and uniquely identifies the fragment flow out of all fragment flows having the same IPv4 source address, IPv4 destination address, and protocol identifier. The IPv4 source address and the IPv4 destination address are IPv4 network addresses that indicate the source and intended destinations, respectively, of the fragments of the fragment flow. The protocol identifier is a value that identifies the transport protocol (e.g., TCP, UDP, etc.) of the fragments of the fragment flow. Each of these values are the same for each fragment of the fragment flow, thereby allowing network device 10 to identify fragments that are part of the fragment flow. Flow table 32 may store an association of the key with an entry of flow table 32, or otherwise associate the key with the entry, so that flow table 32 may use the key to index into the appropriate entry of flow table 32 for the fragment flow.

An entry in flow table 32 for a fragment flow associated with an IPv4 network packet may include a state field ("State"), a destination port field ("DPORT"), a sent bytes field ("SNT_BYTS"), a queued bytes field ("QUED_BYTS"), a total length field ("TOTAL_BYTS"), and a timer field ("Timer"). The state field may store a value that indicates the state of the fragment flow. In some example aspects, a fragment flow associated with an IPv4 network packet may be in one of the following states: a new entry state, a buffer state, an encapsulation state, and a drop state.

A fragment flow is in a new entry state when flow table 32 does not include an entry for the fragment flow. Thus, the value of the state field may only indicate whether the fragment flow is in a buffer state, an encapsulation state, or a drop state. The buffer state indicates that packet module 30 will buffer fragments of the fragment flow received by packet module 30 in fragment buffer 28 because packet module 30 has yet to receive a fragment of the fragment flow that includes an indication of the destination port. The encapsulation state indicates that packet module 30 has received a fragment of the fragment flow that includes an indication of the destination port and therefore will encapsulate and forward fragments of the fragment flow. The drop state indicates that packet module 30 will drop fragments of the fragment flow and refrain from buffering, encapsulating, or forwarding fragments of the fragment flow.

The destination port field may store a value that indicates the destination port. As discussed above, only one fragment of a fragment flow may include an indication of the destination port. As such, packet module 30 may update the destination port field when network device 10 has received the fragment of the fragment flow that includes an indication of the destination port.

The sent bytes field may store a value indicative of the total size of the fragments of the fragment flow that network device 10 has dispatched. Each time network device 10 dispatches, via IFCs 22, an encapsulated fragment of the fragment flow, packet module 30 may increment the value of the sent bytes field by the size of the dispatched fragment. The queued bytes field may store a value indicative of the total size of the fragments of the fragment flow currently being buffered by network device 10 in fragment buffer 28. Each time network device 10 receives and buffers a fragment of the fragment flow in fragment buffer 28, packet module 30 may increment the value of the queued bytes field by the size of the buffered fragment. The total length field may store a value indicative of the total size of all of the fragments of the fragment flow. When network device 10 receives the last fragment of the fragment flow, packet module 30 may be able to determine the total size of all of the fragments of the fragment flow based on the offset of the last fragment and the size of the last fragment.

The sizes of the fragments indicated by the values of the sent bytes field, queued bytes field, and total bytes field may not include the size of the IPv4 headers included in the fragments. As will be further discussed below, each fragment of an IPv4 packet may include a respective IPv4 header and data section. As such, the values of the sent bytes field, queued bytes field, and total bytes field may indicate the size of the data sections of the fragments that have been sent by network device 10, the size of the data sections of the fragments buffered by network device 10, and the size of the data sections of all fragments making up the fragment flow, respectively. Packet module 30 may determine the size of the data section of a fragment by subtracting the size of the IPv4 header from the size of the fragment.

The timer field may store a value indicative of the amount of time that has elapsed during processing of the fragment flow. As network device 10 receives fragments of the fragment flow, packet module 30 may update the value of the timer field with the amount of time that has elapsed during processing of the fragment flow. If the amount of time that has elapsed during processing of the fragment flow exceeds a reassembly time out value, network device 10 may cease forwarding of the fragments of the fragment flow. In this way, packet module 30 may utilize flow table 32 during its processing of fragments of a fragment flow.

Packet module 30 may also execute at packet processors 24 to receive IPv6 network packets from IPv6 network 6, via IFCs 22, that encapsulate fragments of an IPv4 network packet that are to be forwarded to IPv4 network 4. Packet module 30 may decapsulate the fragments of the IPv4 network packet from the IPv6 network packets, perform an anti-spoof check on the decapsulated fragments, and, if the fragments pass the anti-spoof checks, forward the fragments to IPv4 network 4 without reassembling an IPv4 network packet from its fragments. Packet module 30 may perform the anti-spoof checks when anti-spoof check is enabled in packet module 30. If anti-spoof check is not enabled, packet module 30 may forward the fragments to IPv4 network 4 without performing the anti-spoof checks.

The set of fragments of an IPv4 network packet encapsulated within the IPv6 network packets that are received by network device 10 is also referred to herein as a fragment flow, where every fragment of a particular IPv4 network packet is part of the same fragment flow. Each fragment of the fragment flow may be encapsulated within a respective IPv6 network packet, and network device 10 may receive IPv6 network packets that encapsulate fragments of the fragment flow from IPv6 network 6.

Packet module 30 may perform an anti-spoof check on each fragment of such a fragment flow. When packet module 30 receives an IPv6 network packet that encapsulates a fragment of a fragment flow, packet module 30 may decapsulate the fragment from the IPv6 network packet. Upon decapsulating the packet, packet module 30 may perform an anti-spoof check on the decapsulated fragment. If the fragment passes the anti-spoof check, packet module 30 may forward the fragment to IPv4 network 4. If the fragment fails the anti-spoof check, packet module 30 may drop the packet.

Packet module 30 may perform an anti-spoof packet on fragments of a fragment flow associated with an IPv4 network packet by determining whether the IPv4 source address and the source port of the IPv4 network packet are each within a respective acceptable range. If the IPv4 source address and the source port are each within a respective acceptable range, then the fragment passes the anti-spoof check. However, if at least one of the IPv4 source address or the source port is not within a respective acceptable range, then the fragment fails the anti-spoof check.

However, only a single fragment of the fragment flow for an IPv4 network packet may include an indication the source port of the IPv4 network packet. Thus, when packet module 30 encounters fragments of the fragment flow that do not include an indication of the source port of the IPv4 network packet, packet module 30 is unable to perform the anti-spoof check for any fragments of the fragment flow.

Instead, packet module 30 may decapsulate, from IPv6 network packets that network device 10 has received via IFCs 22 from IPv6 network 6, fragments of a fragment flow for an IPv4 network packet. Packet module 30 may buffer the decapsulated fragments of the fragment flow in fragment buffer 28 in the order in which they were received at network device 10 until network device 10 receives and decapsulates the fragment of the fragment flow that includes an indication of the source port of the IPv4 network packet. When network device 10 receives the fragment of the fragment flow that includes an indication of the source port of the IPv4 network packet, packet module 30 may be able to perform anti-spoof checks on each of the fragments of the fragment flow. When network device 10 receives one or more additional fragments of the fragment flow for the IPv4 network packet after it has received the fragment of the fragment flow that includes an indication of the source port of the IPv4 network packet, packet module 30 is able to perform anti-spoof checks on the one or more additional fragments of the fragment flow without buffering the one or more additional fragments of the fragment flow in fragment buffer 28.

When packet module 30 encounters fragments of a fragment flow for which packet module 30 is to perform anti-spoof checks, packet module 30 may add entries associated with fragment flows encountered by packet module 30 to flow table 32, where the fragments of the fragment flow are encapsulated within IPv6 network packets received by network device 10. When packet module 30 has performed anti-spoof checks on all of the fragments of a fragment flow, packet module 30 may delete the entry for the fragment flow from flow table 32.

The entry for the fragment flow may store various information associated with the fragment flow that may be used by packet module 30 to process fragments of the fragment flow in order to perform anti-spoof checks on the fragments of the fragment flow. In particular, packet module 30 may use the information stored in the entry for the fragment flow to determine whether to buffer fragments of the fragment flow received by network device 10 in to fragment buffer 28, or whether to perform anti-spoof checks on the fragments of the fragment flow received by network device 10.

The entry for a fragment flow in flow table 32 may include or otherwise be associated with a key that may be used to index into flow table 32 to look up and locate the entry in flow table 32 for a particular fragment flow entry. The key for an entry in flow table 32 for a fragment flow associated with an IPv4 network packet, where the fragments of the fragment flow are encapsulated in IPv6 network packets, may be generated, such as via hashing, based at least in part on the following values specified by an IPv6 network packet header and an IPv4 network packet header that are each included in each IPv6 network packet: an IPv6 source address, an IPv6 destination address, a fragment identifier, an IPv4 source address, an IPv6 destination address, and a protocol identifier.

The IPv6 source address and the IPv6 destination address are IPv6 network addresses that indicate the source and intended destinations, respectively, of the IPv6 network packet. The IPv4 source address and the IPv4 destination address are IPv4 network addresses that indicate the source and intended destinations, respectively, of the fragment encapsulated by the IPv6 network packet.

The fragment identifier is a value that is the same for each fragment of the fragment flow, and uniquely identifies the fragment flow out of all fragment flows having the same source address, destination address, and protocol identifier. The protocol identifier is a value that identifies the transport protocol (e.g., TCP, UDP, etc.) of the fragments of the fragment flow. Each of these values are the same for each fragment of the fragment flow, thereby allowing network device 10 to identify IPv6 network packets that encapsulate fragments that are part of the fragment flow.

An entry in flow table 32 for a fragment flow associated with an IPv4 network packet may include a state field ("State"), a source port field ("SPORT") a sent bytes field ("SNY_BYTS"), a queued bytes field ("QUED_BYTS"), a dropped bytes field ("DROPPED_BYTS"), a total length field ("TOTAL_BYTS"), and a timer field ("Timer"). The state field may store a value that indicates the state of the fragment flow. A fragment flow associated with an IPv4 network packet may be in one of the following states: a device entry state, a buffer state, a spoof status available state, and a drop state. As network device 10 receives fragments of a fragment flow, network device 10 may create an entry in flow table 32 and populate the fields of the entry with values based at least in part on the fragments of the fragment flow that it has received.

Because a fragment flow is in a new entry state when flow table 32 does not include an entry for the fragment flow, the value of the state field may only indicate whether the fragment flow is in a buffer state, a spoof status available state, or a drop state. The source port field may store a value that indicates the source port. As discussed above, only one fragment of the fragment flow may include an indication of the source port. As such, network device 10 may only update the source port field when it has received the fragment of the fragment flow that includes an indication of the source port.

The sent bytes field may store a value indicative of the total size of the fragments of the fragment flow that has passed the anti-spoof check and has been dispatched. Each time a fragment of the fragment flow passes the anti-spoof check and is dispatched by packet module 30 to IPv4 network 4, packet module 30 may increment the value of the sent bytes field in the fragment flow's entry in flow table 32 by the size of the dispatched fragment. The queued bytes field may store a value indicative of the total size of the fragments of the fragment flow currently being buffered by packet module 30 in fragment buffer 28. Each time packet module 30 receives and buffers a fragment of the fragment flow in fragment buffer 28, packet module 30 may increment the value of the queued bytes field by the size of the buffered fragment.

The dropped bytes field may store a value indicative of the total size of the fragments of the fragment flow that packet module 30 has dropped. Packet module 30 may drop fragments of the fragment flow if they fail the anti-spoof check or if the amount of time that has elapsed during processing of the fragment flow exceeds a reassembly timeout. Each time a fragment of the fragment flow fails the anti-spoof check and is dropped, packet module 30 may increment the value of the sent bytes field by the size of the dropped fragment.

The total length field may store a value indicative of the total size of all of the fragments of the fragment flow. When packet module 30 receives the last fragment of the fragment flow, packet module 30 may be able to determine the total size of all of the fragments of the fragment flow based on the offset of the last fragment and the size of the last fragment. The sizes of the fragments indicated by the values of the sent bytes field, queued bytes field, dropped bytes field, and total bytes field may not include the size of the IPv4 headers included in the fragments. As will be further discussed below, each fragment of an IPv4 packet may include a respective IPv4 header and data section. As such, the values of the sent bytes field, queued bytes field, dropped bytes field, and total bytes field may indicate the size of the data sections of the fragments that have been sent by network device 10, the size of the data sections of the fragments buffered by network device 10, the size of the data sections of the fragments dropped by network device 10, and the size of the data sections of all fragments making up the fragment flow, respectively. Packet module 30 may determine the size of the data section of a fragment by subtracting the size of the IPv4 header from the size of the fragment.

The timer field may store a value indicative of the amount of time that has elapsed during processing of the fragment flow. As packet module 30 receives fragments of the fragment flow, packet module 30 may update the value of the timer field with the amount of that that has elapsed during processing of the fragment flow. If the amount of time that has elapsed during processing of the fragment flow exceeds a reassembly time out value, packet module 30 may cease forwarding of the fragments of the fragment flow.

Figure 3A:
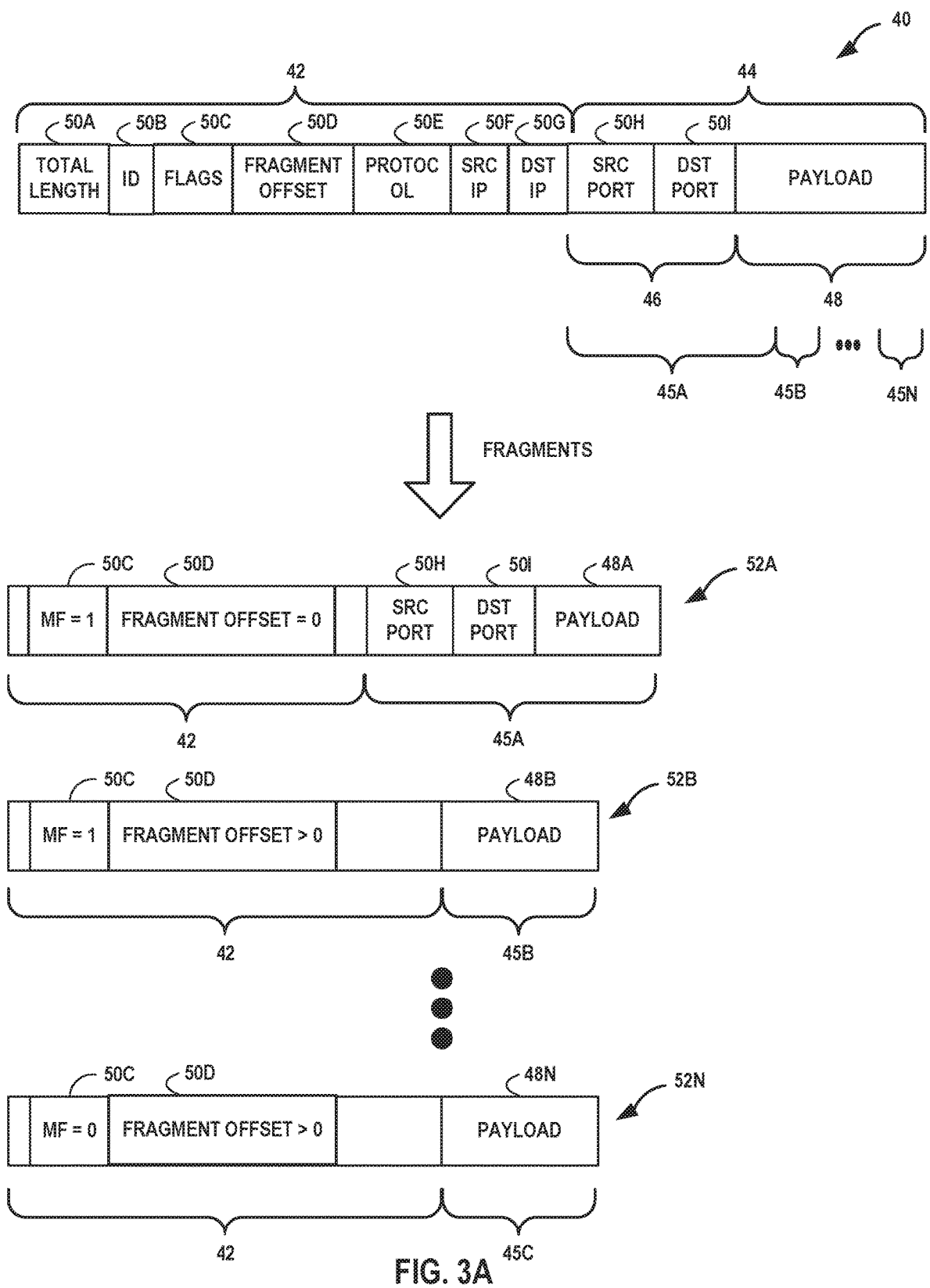
FIGS. 3A and 3B are block diagrams illustrating an example IPv4 network packet that is fragmented into example fragments and example IPv6 network packets that encapsulate the example fragments of the example IPv4 network packet, according to the techniques described herein.
Figure 3B:
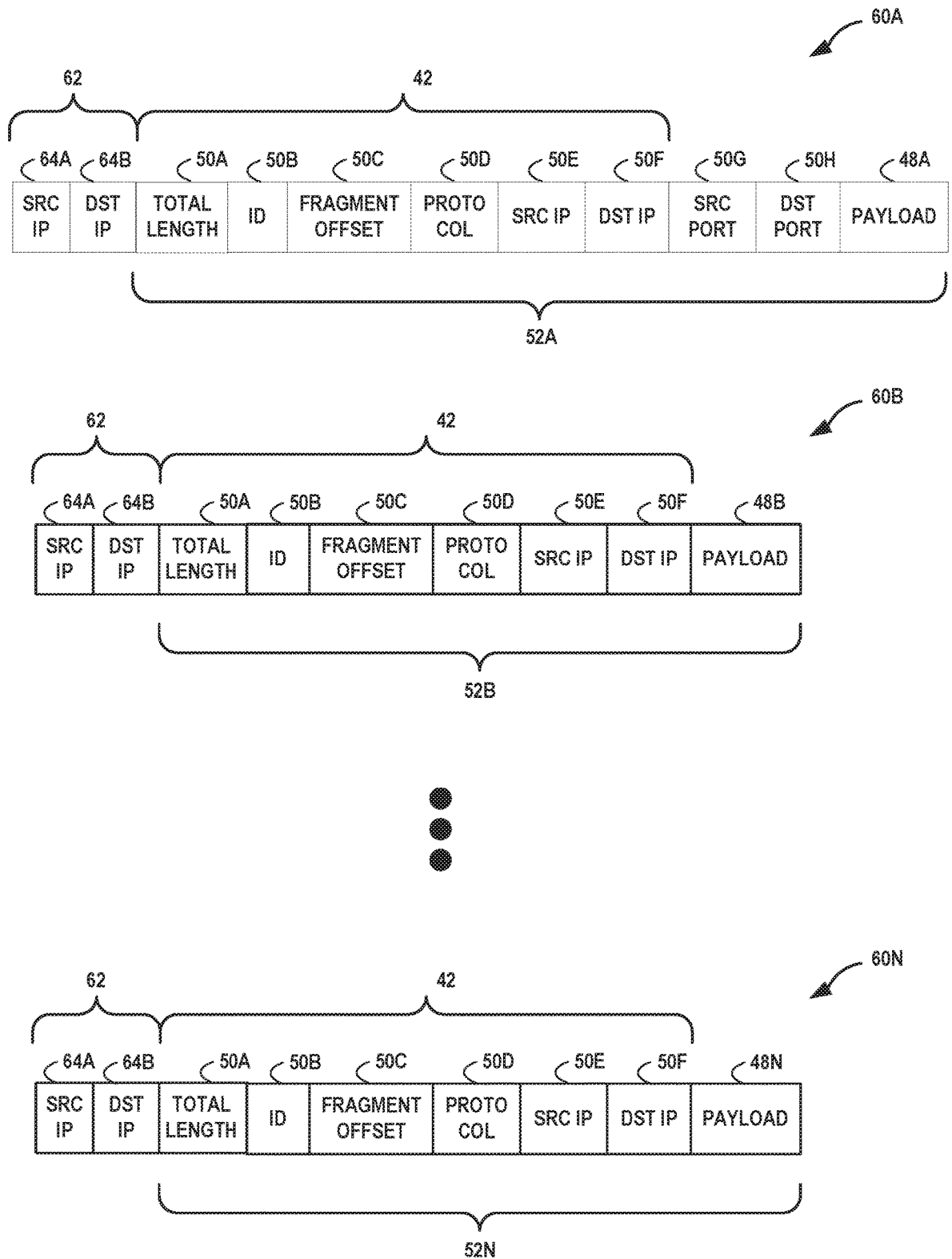

FIGS. 3A and 3B are block diagrams illustrating an example IPv4 network packet that is fragmented into example fragments and example IPv6 network packets that encapsulate the example fragments of the example IPv4 network packet, according to the techniques described herein. A network device, such as network device 10, may receive fragments of IPv4 network packets from an IPv4 network, such as IPv4 network 4, and may encapsulate the fragments within IPv6 network packets for transmission to an IPv6 network, such as IPv6 network 6. Network device 10 may also receive from an IPv6 network, such as IPv6 network 6, IPv6 network packets that encapsulate fragments of IPv4 network packets. Network device 10 may decapsulate the fragments of IPv4 network packets from the IPv6 network packets and may perform anti-spoof checks on the decapsulated fragments of IPv4 networks.

Figure 4:
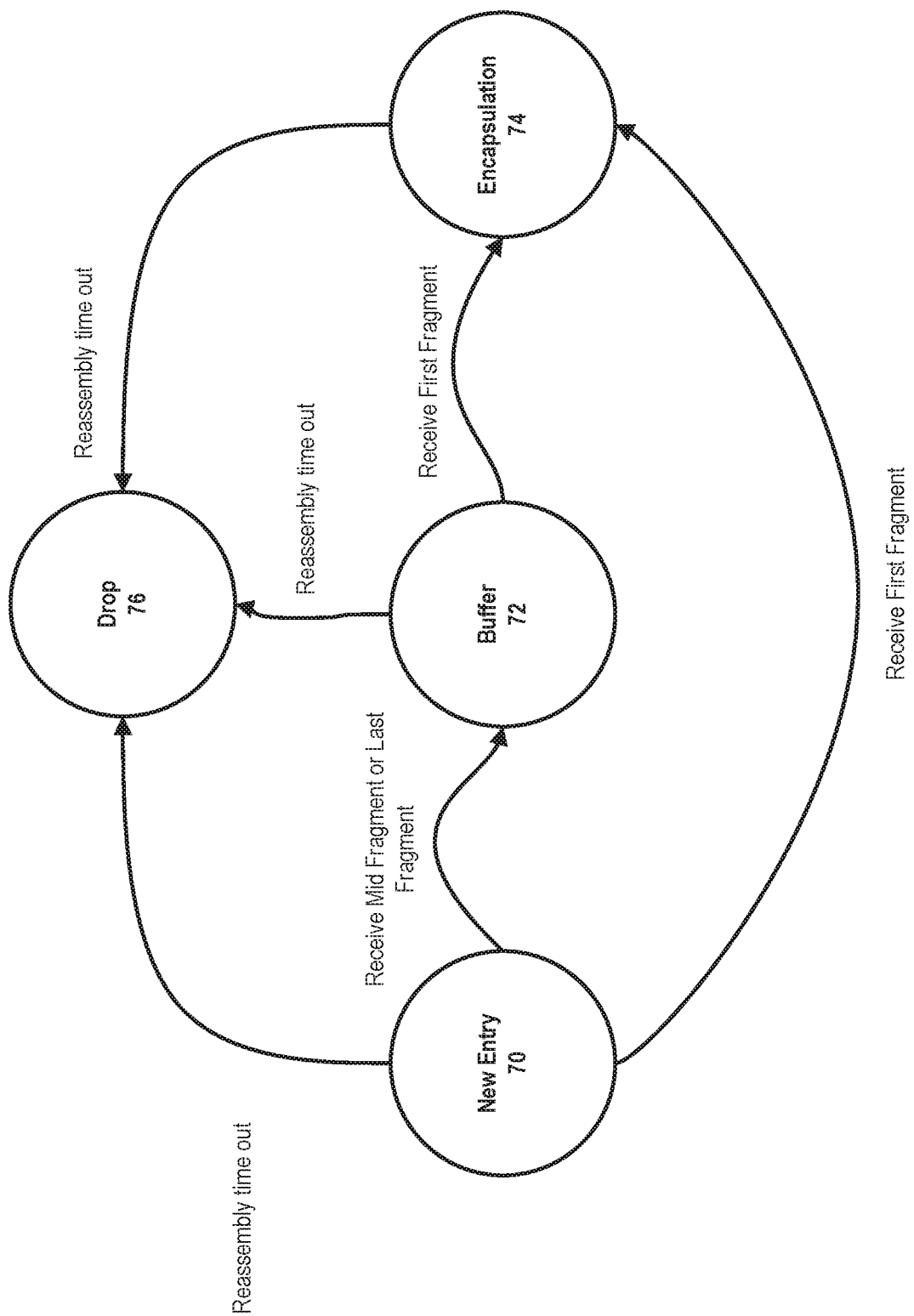
FIG. 4 is a block diagram illustrating the state transitions of an example fragment flow, according to the techniques described herein.

As shown in FIG. 3A, IPv4 network packet 40 may include header 42 followed by data section 44. Header 42 may include fields that specifies various information regarding IPv4 network packet 40. In the example of FIG. 4, the fields in header 42 may include total length 50A, identification 50B, flag 50C, fragment offset 50D, protocol 50E, source address 50F, and destination address 50G. Header 42 may include additional fields not shown in FIG. 4. For example, header 42 may include a total of fourteen fields, thirteen of which are required.

Total length 50A is the size of IPv4 network packet 40, including header 42 and data section 44. When part of a fragment of IPv4 network packet 40, total length 50A may be the size of the fragment rather than the size of IPv4 network packet 40.

Identification 50B is a value that uniquely identify the groups of fragments making up IPv4 network packet 40. Identification 50B may be referred to throughout this disclosure as fragment ID. Flags 50C may include one or more flags. Flags 50C may include a Don't Fragment (DF) flag that may be set (e.g., have a value of one) if IPv4 network packet 40 cannot be fragmented, and may not be set (e.g., has a value of zero) if IPv4 network packet 40 can be fragmented. Flags 50C may also include a More Fragments (MF) that is set (e.g., have a value of one) for each fragment of IPv4 network packet 40 other than the last fragment.

Fragment offset 50D specifies the offset of a particular fragment of IPv4 network packet 40 relative to the beginning of the original unfragmented IPv4 network packet 40. The first fragment has an offset of zero. Protocol 50E specifies the protocol used in data section 44 of IPv4 network packet 40, such as Transmission Control Protocol (TCP) or User Datagram Protocol (UDP). Source address 50F specifies the IPv4 address of the sender of IPv4 network packet 40. Destination address 50G specifies the IPv4 address of the receiver of IPv4 network packet 40.

Data section 44 of IPv4 network packet 40 may include data associated with the transport layer protocol, such as TCP, UDP, and the like, utilized by IPv4 network packet 40. Data section 44 of IPv4 network packet 40 may include transport protocol header 46 followed by payload 48. Transport protocol header 46 may be a TCP header, UDP header, and the like depending on the transport layer protocol used by IPv4 network packet 40. Transport protocol header 46 may include source port 50H and destination port 50I. Source port 50H identifies the sending port of IPv4 network packet 40, and destination port 50I identifies the destination port of IPv4 network packet 40. Transport protocol header 46 may include additional fields not shown in FIG. 3A. Payload 48 may be data carried by IPv4 network packet 40 besides header 42 and transport protocol header 46.

Fragmenting IPv4 network packet 40 includes dividing data section 44 of IPv4 network packet 40 into sequential data section fragments 45A-45N ("data section fragments 45"), which are sequential non-overlapping portions of data section 44 of IPv4 network packet 40. Data section fragment 45A may include a sequentially first portion of data section 44, including transport protocol header 46 and a first portion of payload 48. Data section fragment 45N may include the sequentially last non-overlapping portion of payload 48. One or more data section fragments, such as data section fragment 45B, may each contain a non-overlapping portion of payload 48 between the portions of payload 48 contained in data section fragment 45A and data section fragment 45N. As can be seen, only data section fragment 45A contains transport protocol header 46, while none of the remaining data section fragments 45B-45N contains transport protocol header 46.

Fragments 52A-52N ("fragments 52") of IPv4 network packet 40 may each contain IPv4 header 42 and one of data section fragments 45. Fragment 52A that contains data section fragment 52A, and is an example of a first fragment of IPv4 network packet 40 because it contains the sequentially first portion of data section 44. Fragment 52N that contains data section fragment 45N, and is an example of a last fragment of IPv4 network packet 40 because it contains the sequentially last portion of data section 44. Fragment 52B that contains data section fragment 52B is an example of a mid fragment of IPv4 network packet 40 because it contains a data section fragment (e.g., data section fragment 45B) that is not sequentially the first portion of data section 44 or the last portion of data section 44.

IPv4 network packet 40 may be fragmented into a plurality of fragments 52. Plurality of fragments 52 may include one first fragment (i.e., fragment 52A), one last fragment (i.e., fragment 52N), and one or more mid fragments (i.e., fragment 52B). Each fragment of fragments 52 includes the fields of IPv4 header 42, including fields 50A-50G. While the values for each of fields 50A-50G are the same for each fragment of fragments 52, some of the fields may contain different values. For example, the first fragment such as fragment 52A and the one or more mid fragments, such as fragment 52B, may each have the More Fragments (MF) flag in flags 50C be set (e.g., have a value of one) because they are not the last fragment. Meanwhile, the last fragment such as fragment 52N may have the MD flag in flags 50C not be set (e.g., have a value of zero). In addition, the value of fragment offset 50D may be different for each fragment of fragments 52. For example, the value of fragment offset 50D for the first fragment such as fragment 52A is zero, while the value of fragment offset 50D for other fragments is non-zero.

While fragments 52 are referred to as first fragment, mid fragment, and last fragment, it should be understood that these names do not necessarily refer to the order in which network device 10 may receive these fragments 52, because fragments 52 may arrive out of order at network device 10. Instead, the terms first, mid, and last refer to the sequential portions of data section 44 that are included in the respective fragments 52.

When fragments 52 arrive at network device 10, network device 10 may encapsulate fragments 52 into IPv6 network packets, where each fragment of fragments 52 is encapsulated within a separate IPv6 network packet. Thus, if fragments 52 includes a total of five fragments, network device 10 may encapsulate the five fragments within five IPv6 network packets that each contain one of the five fragments.

As shown in FIG. 3B, when network device 10 receives fragments 52, network device 10 may perform MAP-E to encapsulate fragments 52 within IPv6 network packets 60A-60N ("IPv6 network packets 60"). In particular, network device 10 may encapsulate fragment 52A within IPv6 network packet 60A, encapsulate fragment 52B within IPv6 network packet 60B, encapsulate fragment 52N within IPv6 network packet 60N, and so on. An IPv6 network packet includes IPv6 header 62 and a payload (e.g., one of fragments 52). Thus, IPv6 network packet 60A includes IPv6 header 62 and fragment 52A, IPv6 network packet 60B includes IPv6 header 62 and fragment 52B, and IPv6 network packet 60C includes IPv6 header 62 and fragment 52C. IPv6 header 62 may include IPv6 source address 64A and IPv6 destination address 64B. IPv6 source address 64A specifies the IPv6 address of the sender of IPv4 network packet 40, a fragment of which is contained in the IPv6 network packet. IPv6 destination address 64B specifies the IPv6 address of the receiver of the IPv6 network packet. It should be understood that IPv6 header 62 may include additional fields that are not shown in FIG. 3B.

To perform MAP-E to encapsulate fragments 52 within IPv6 network packets 60, network device 10 may generate IPv6 network header 62, including IPv6 source address 64A and IPv6 destination address 64B, based at least in part on fragments 52. Because IPv4 network packet 40 uses an address plus port technique for packet routing, where the source address 50F specified by IPv4 network packet 40 is extended by at least a portion of the source port 50H specified by IPv4 network packet 40, and the destination addresses 50G specified by IPv4 network packet 40 is extended by at least a portion of the destination port 50I specified by the IPv4 network packet 40, network device 10 may not be able to generate IPv6 network header 62 until it receives fragment 52A that includes source port 50H and destination port 50I.

However, network device 10 may not necessarily receive fragment 52A that contains destination port 521 before it receives other fragments of fragments 52. If network device 10 receives one or more fragments of fragments 52 other than fragment 52A before network device 10 receives fragment 52A, network device 10 may not be able to encapsulate the one or more fragments of fragments 52 that it has received. Instead, network device 10 may buffer the one or more fragments of fragments 52 that it has received in fragment buffer 28 until it receives fragment 52A that includes source port 50H and destination port 50I. When network device 10 receives fragment 52A that includes source port 50H and destination port 50I, network device 10 may be able to generate IPv6 header 62, including IPv6 source address 64A and IPv6 destination address 64B, based at least in part on source port 50H and destination port 50I included by fragment 52A. Network device 10 may utilize IPv6 header 62 to encapsulate fragment 52A and the one or more fragments stored in fragment buffer 28 into IPv6 network packets 60, and dispatch IPv6 network packets 60 to IPv6 network 6.

In some examples, network device 10 may also receive IPv6 network packets 60 that may encapsulate fragments 52 of a fragment flow associated with IPv4 network packet 40. Network device 10 may decapsulate fragments 52 from the received IPv6 network packets 60, perform anti-spoof checks on fragments 52, and, if fragments 52 pass the anti-spoof checks, forward fragments 52 onto IPv4 network 4.

Network device 10 may perform anti-spoof checks on fragments 52 based at least in part on IPv4 source address 50F and source port 50H included in fragments 52 by determining whether each of source address 50F and source port 50H is within a respective acceptable range. If each of source address 50F and source port 50H is each within a respective acceptable range, then fragments 52 may pass the fragment check.

However, only the first fragment (e.g., fragment 52A) of the fragment flow, contains source port 50H, and network device may not necessarily receive fragment 52A that contains source port 50H before it receives other fragments of fragments 52. If network device 10 receives one or more fragments of fragments 52 other than fragment 52A before network device 10 receives fragment 52A, network device 10 may not be able to perform anti-spoof checks on the one or more fragments of fragments 52 that it has received. Instead, network device 10 may buffer the one or more fragments of fragments 52 that it has received in fragment buffer 28 until it receives fragment 52A that includes source port 50H. When network device 10 receives fragment 52A that includes source port 50H, network device 10 may be able to perform an anti-spoof check on fragments 52 of the fragment flow based at least in part on source port 50H included in fragment 52A. If the fragments 52 of the fragment flow pass the anti-spoof check, network device 10 may forward fragments 52 of the fragment flow to IPv4 network 4.

As network device 10 receives, buffers, and encapsulates fragments 52 of a fragment flow, the fragment flow may transition between different states. FIG. 4 is a block diagram illustrating the state transitions of an example fragment flow, according to the techniques described herein. As shown in FIG. 4, the state of a fragment flow may be new entry state 70, buffer state 72, encapsulation state 74, or drop state 76. New entry state 70 indicates that network device 10 has yet to receive any fragments 52 of the fragment flow. Buffer state 72 indicates that network device 10 is currently buffering fragments 52 that it receives but cannot yet encapsulate and dispatch any of the received fragments 52. Encapsulation state 74 indicates that the network device 10 is currently able to encapsulate and dispatch any fragments 52 that it receives. Drop state 76 indicates that network device 10 is currently dropping any fragments 52 that it receives.

A fragment flow is in new entry state 70 until it receives a fragment of the fragment flow. When the fragment flow is in new entry state 70, the fragment flow may transition to buffer state 72 if network device 10 receives a mid fragment or a last fragment of the fragment of flows, or may transition to encapsulation state 74 if network device 10 receives a first fragment of the fragment flows. When the fragment flow is in buffer state 72, network device 10 is unable to encapsulate any fragments 52 of the fragment flow it receives. Instead, network device 10 may store fragments it has received in fragment buffer 28. When network device 10 receives additional mid fragments or the last fragment of the fragment flow when the fragment flow is in buffer state 72, the fragment flow may remain in buffer state 72 and network device 10 may store the fragments it receives in fragment buffer 28.

Regardless of whether the fragment state is in new entry state 70 or buffer state 72, when network device 10 receives a first fragment of the fragment flow, network device 10 is able to transition to encapsulation state 74. When the fragment flow is in encapsulation state 74, network device 10 has received the first fragment of the fragment flow that includes an indication of the destination port of IPv4 network packet 40. Thus, network device 10 is now ready to encapsulate fragments 52 that it has received in IPv6 network packets 60 and dispatch the IPv6 network packets 60 to IPv6 network 6. When network device 10 receives additional fragments 52 while the fragment flow is in encapsulation state 74, network device 10 may encapsulate the additional fragments 52 it receives in IPv6 network packets 60 and dispatch the IPv6 network packets 60 to IPv6 network 6 without buffering the additional fragments 52 in fragment buffer 28.

When the fragment is in new entry state 70, buffer state 72, or encapsulation state 74, the fragment flow may transition to a drop state 76 when the time elapsed for processing fragments 52 exceeds a reassembly time out, or when an error occurs. Examples of the length of time for a reassembly time out may be 30 seconds, 45 seconds, and the like. When the fragment flow is in drop state 76, network device 10 may drop any fragments 52 that it receives. Dropping a fragment may include network device 10 refraining from encapsulating or forwarding fragments 52 to IPv6 network 6.

Figure 5A:
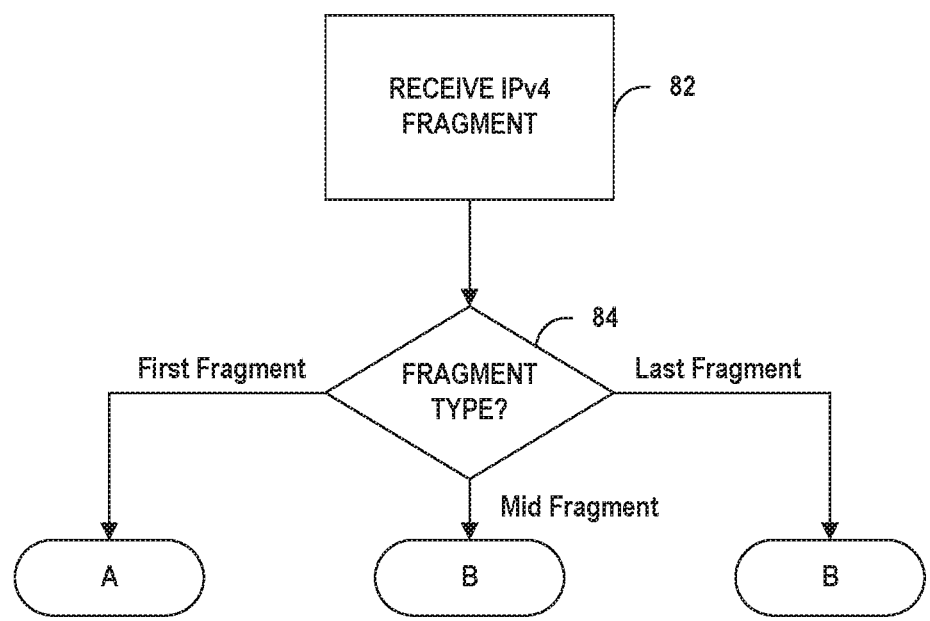
FIGS. 5A-5C depict a flowchart illustrating an example process for encapsulate IPv4 packets in IPv6 packets without reassembling the IPv4 packets, according to techniques described herein.
Figure 5B:
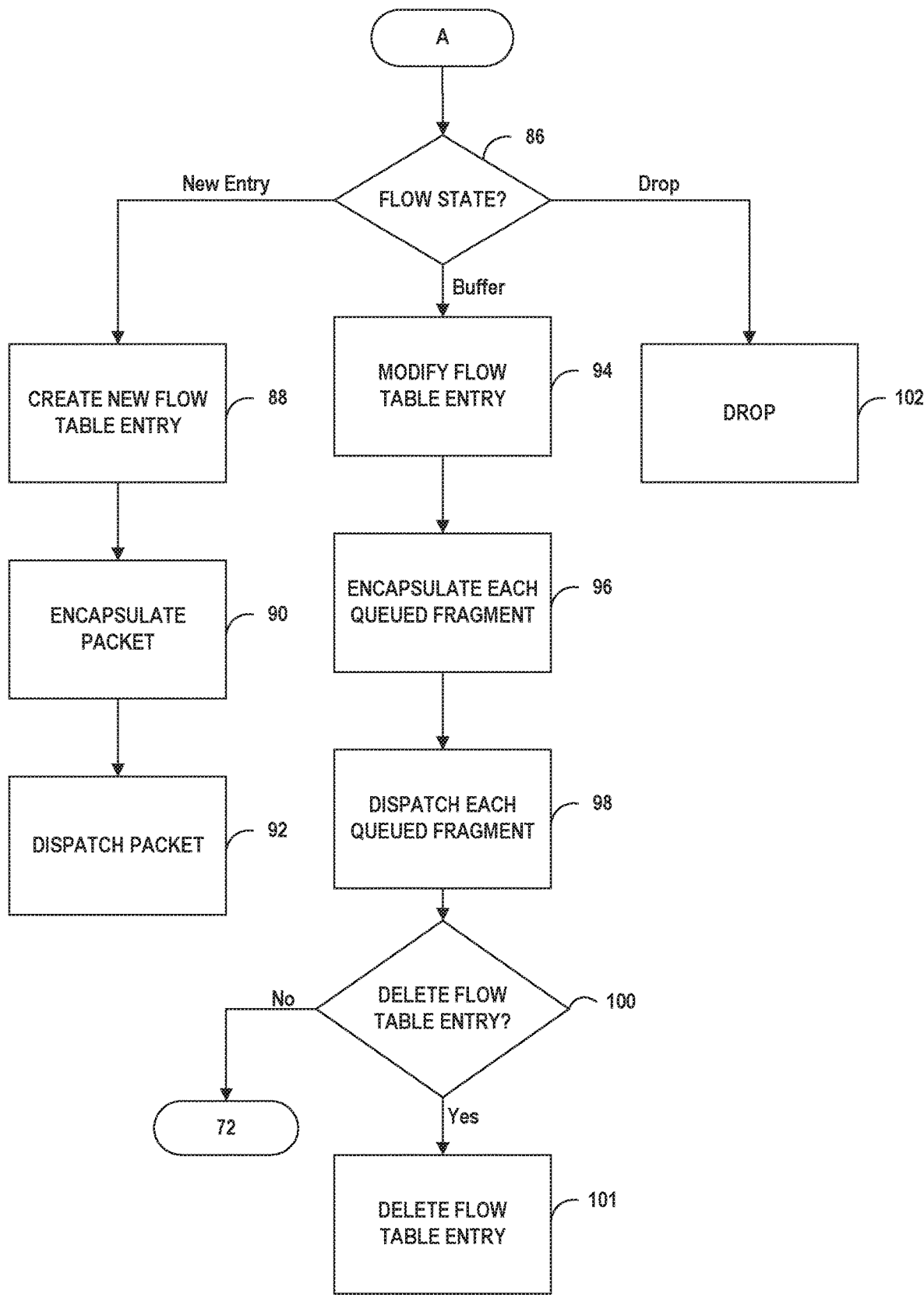
Figure 5C:
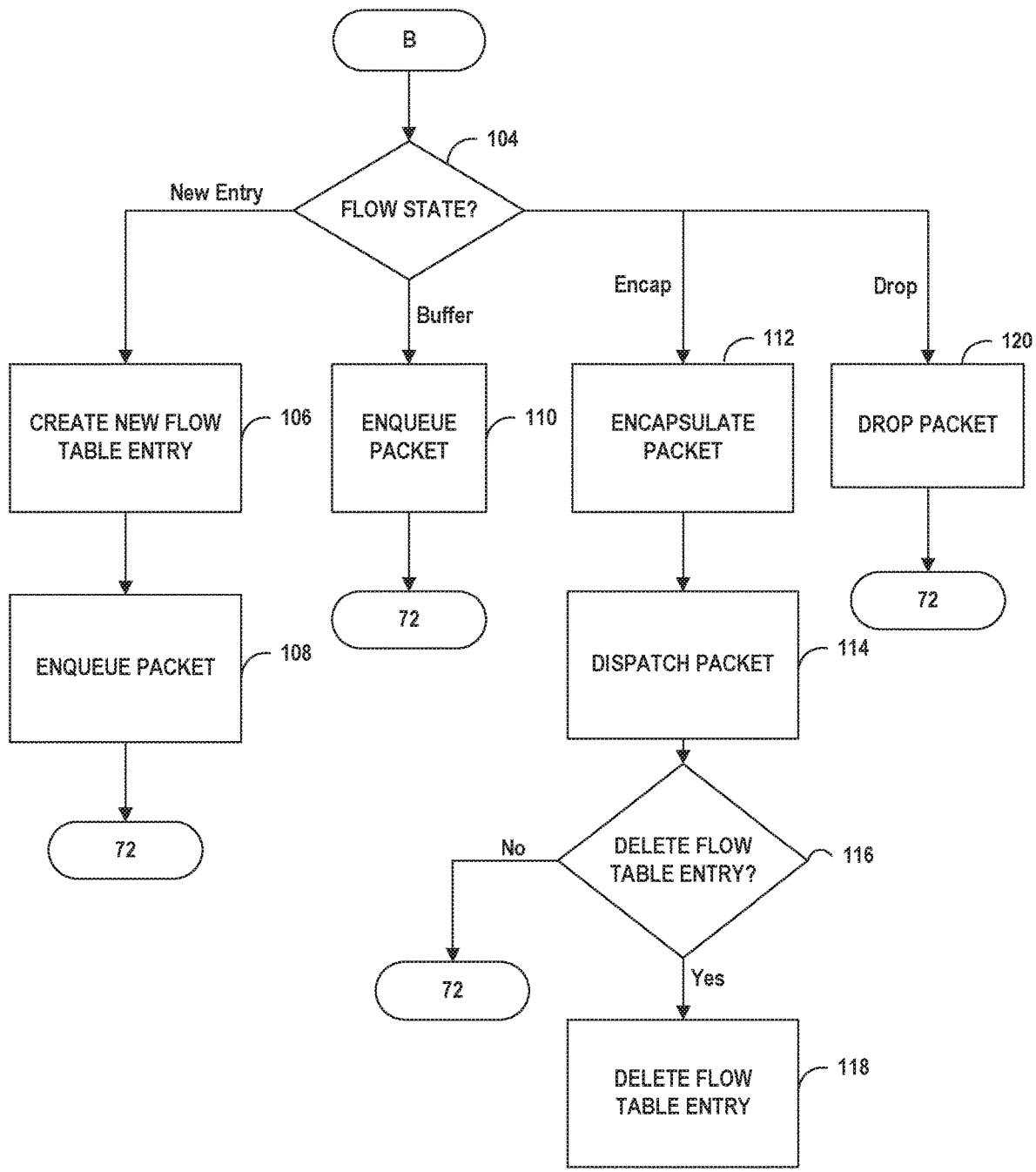

FIGS. 5A-5C depict a flowchart illustrating an example process for encapsulate IPv4 packets in IPv6 packets without reassembling the IPv4 packets, according to techniques described herein. Such a process can be performed by a network device, such as network device 10, that is connected to an IPv4 network such as IPv4 network 4 and to an IPv6 network such as IPv6 network 6. As shown in FIG. 5A, network device 10 may receive a fragment of an IPv4 network packet, such as one of fragments 52 of IPv4 network packet 40, from IPv4 network 4 (82).

As discussed throughout this disclosure, network device 10 may buffer every fragment of a flow that it receives until it receives a first fragment of the flow. Once network device 10 receives the first fragment of the flow, it has the necessary information, such as the destination port, to perform encapsulation of each of the fragments of the flow that it has received. Thus, network device 10 determine the type of action to take in response to receiving the fragment based at least in part on the type of the fragment. Further, as discussed above with respect to FIG. 4, the type of action that network device 10 takes in response to receiving a fragment may also be based at least in part on the state of the fragment flow.

As such, when network device 10 receives the fragment, network device 10 may determine the fragment type of the fragment as well as the state of the fragment flow of the fragment in order to determine an action to perform in response to receiving the fragment. Network device 10 may determine the fragment type of a fragment as being one of: a first fragment (e.g., fragment 52A), a mid fragment (e.g., fragment 52B), or a last fragment (e.g., fragment 52N) of the fragment flow based at least in part on information contained in the fragment (84). For example, IFCs 22 of network device 10 may receive the fragment, and packet module 30 of network device 10 may determine the fragment type of the fragment.

Network device 10 may determine whether the fragment is a first fragment, mid fragment, or last fragment of the fragment flow based at least in part on the fragment offset 50D and flag 50C in IPv4 header 42 of the fragment. In particular, network device 10 may determine that the fragment is a first fragment of the fragment flow if the value of fragment offset 50D is equal to zero and if the More Fragments flag in flags 50C is set. Network device 10 may determine that the fragment is a mid fragment if the value of fragment offset 50D is non-zero and the More Fragments flag in flags 50C is set. Network device 10 may determine that the fragment is a last fragment if the value of fragment offset 50D is non-zero and the More Fragments flag in flags 50C is not set.

Besides determining the type of the fragment, network device 10 may also determine the state of the fragment flow at the time network device 10 receives the fragment. The state of the fragment flow may also inform network device 10 as to the action it takes in response to receiving the fragment. A fragment flow may be in one of four states: new entry, buffer, encapsulation, or drop. A fragment flow may be in a new entry state when network device 10 has not yet received any fragments of the fragment flow. A fragment flow may be in a buffer state when it has received one or more fragments of the fragment flow, but has yet to receive the first fragment of the fragment flow that includes an indication of the destination port. A fragment flow may be in an encapsulation state when it has received the first fragment of the fragment flow that includes an indication of the destination port. A fragment flow may be in a drop state when each fragment of the fragment flow is to be dropped by network device 10. For example, packet module 30 of network device 10 may determine the state of the fragment flow.

When the fragment flow is in a buffer state, network device 10 may be able to buffer any fragments of the fragment flow that it receives in fragment buffer 28, but may not be able to encapsulate and dispatch the fragments of the fragment flow it has received. When the flow state is in an encapsulation state, network device 10 may be able to encapsulate and dispatch fragments of the fragment flow that it has received. When the fragment flow is in a drop state, network device 10 may drop any fragments of the fragment flow that it receives.

As shown in FIG. 5B, when the fragment is a first fragment 52A, network device 10 may determine the fragment flow for the fragment to be in one of the following flow states: new entry, buffer, or drop. (86). Because network device 10 cannot encapsulate fragments of the fragment flow until it has received the first fragment of the fragment flow, the fragment flow cannot be in encapsulation mode until network device 10 receives the first fragment of the fragment flow. While FIGS. 5A and 5B illustrates that the fragment's type is determined before determining the state of the fragment flow for the fragment, it should be understood that such determinations may occur in any order, or may occur simultaneously. For example, network device 10 may determine the state of the fragment flow for the fragment prior to determining the fragment type of the fragment.

Network device 10 may determine the state of the fragment flow by performing a lookup into flow table 32 to determine whether flow table 32 includes an entry for the particular fragment flow and, if so, determine the value of the state field of the flow table entry for the fragment flow. Network device 10 may perform the lookup into flow table 32 by indexing into flow table 32 using a key that network device 10 may generate based at least in part on the contents of the fragment. Because each fragment may include IPv4 header 42, network device 10 may generate the key based at least in part on a portion of IPv4 header 42. In one example, network device 10 may generate the key based at least in part on fragment ID, source address, destination address, and protocol ID contained in IPv4 header 42 because they may uniquely identify the fragment flow compared with other fragment flows. For example, network device 10 may hash the fragment ID, source address, destination address, and protocol ID to generate a key that is used to index into flow table 32 to lookup the flow table entry for the fragment flow.

Network device 10 may determine the fragment flow to be in the new entry state when flow table 32 does not include an entry for the fragment flow. In response to determining that the fragment is a first fragment and that the state of the fragment flow is new entry, network device 10 may create an entry for the fragment flow in flow table 32 for the fragment flow (88). For example, packet module 30 of network device 10 may create the entry for the fragment flow in flow table 32 and update the fields of the entry in flow table 32. As discussed above, an entry for the fragment flow in flow table 32 may include fields such as state, destination port, sent bytes, queued bytes, total bytes, and timer. Because the first fragment includes an indication of the destination port, network device 10 may update the destination port field in the entry to the destination port indicated by the first fragment. Further, when network device 10 receives the first fragment of the fragment flow, network device 10 may change the state of the fragment flow from new entry to encapsulation by setting the state field of the entry to a value that indicates encapsulation state.

In addition, because the first fragment can be encapsulated and dispatched without being buffered in fragment buffer 28, network device 10 may also set the sent bytes field to the size of the data section (e.g., data section 45A) of the fragment. The IPv4 header (e.g., IPv4 header 42) of the fragment includes total length 50A that indicates the size of the fragment inclusive of the IPv4 header. Thus, network device 10 may determine the size of the data section of the fragment based at least in part on the total length 50A by subtracting the size of the IPv4 header from the value of total length 50A.

Network device 10 may proceed to encapsulate the first fragment according to MAP-E (90) and to dispatch the encapsulated first fragment to IPv6 network 6 (92). After encapsulating and dispatching the first fragment, the fragment flow may remain in the encapsulation state, and process may return to step 82 for network device 10 to receive further segments of the fragment flow. For example, packet module 30 of network device 10 may encapsulate the first fragment.

If the current fragment is a first fragment of the fragment flow, and if flow table 32 includes an entry for the fragment flow, then the state field of the entry for the format flow may indicate whether the fragment flow is in a buffer state or whether the state of the fragment flow is in a drop state. As discussed above, a fragment flow may be in a buffer state when network device 10 has already received and buffered one or more fragments of the fragment flow.

In response to determining that the current fragment is a first fragment of the fragment flow, and that the state of the fragment flow is drop, network device 10 may drop the fragment (i.e., refrain from forwarding the fragment to IPv6 network 6) (92).

In response to determining that the current fragment is a first fragment of the fragment flow, and that the fragment flow is in a buffer state, network device 10 may update the entry for the fragment flow in flow table 32 based on the first fragment (94). Network device 10 may update the value of the state field of the fragment flow from indicating a buffer state to indicating an encapsulation state and update the value of the destination port field in the entry to indicate the destination port indicated by the first fragment.

Because receiving the first fragment of the fragment flow enables network device 10 to encapsulate and forward the fragments of the fragment flow it has been buffering, network device 10 may also update the value of the sent bytes field of the entry to indicate current value of the queued bytes field plus the size of the data section (e.g., data section 45A) of the fragment. As discussed above, the IPv4 header (e.g., IPv4 header 42) of the fragment includes total length 50A that indicates the size of the fragment inclusive of the IPv4 header. Thus, network device 10 may determine the size of the data section of the fragment based at least in part on the total length 50A by subtracting the size of the IPv4 header from the value of total length 50A. Network device 10 may also set the value of the queued bytes field of the entry to indicate zero due to network device 10 being able to encapsulate and forward the fragments of the fragment flow it has been buffering.

Network device 10 may proceed to encapsulate each fragment of the flow that it has buffered, plus the first fragment, using MAP-E (96) and may dispatch each of the encapsulated fragments to IPv6 network 6 (98). For example, packet module 30 of network device 10 may encapsulate the fragments of the fragment flow and may dispatch the encapsulated packets via IFCs 22 to IPv6 network 6. In response to encapsulating and dispatching each fragment of the fragment flow that it has received, network device 10 may determine whether to delete the entry for the fragment flow in flow table 32 (100). Network device 10 may delete the entry for the fragment flow in flow table 32 if it has encapsulated and forwarded all fragments of the fragment flow.

Network device 10 may determine it has encapsulated and forwarded all fragments of the fragment flow by determining whether the amount of data it has sent to forward fragments of the fragment flow is equal to the total size of all of the fragments of the fragment flow. Network device 10 may determine if the value of the total bytes field of the entry for the fragment flow is greater than zero and if the value of the total bytes field is equal to the value of the sent bytes field of the entry. If so, network device 10 may determine that it has encapsulated and forwarded all fragments of the fragment flow and may delete the entry for the fragment flow from flow table 32, thus ending the forwarding of fragments performed by network device 10 for the particular fragment flow (101). If network device 10 determines it has not encapsulated and forwarded all fragments of the fragment flow, network device 10 may refrain from deleting the entry for the fragment flow, and may return to step 82 to receive additional fragments of the fragment flow. For example, packet module 30 of network device 10 may determine whether it has encapsulated and forwarded all fragments of the fragment flow.

As discussed above, a fragment may be a first fragment, a mid fragment, or a last fragment. As shown in FIG. 5C, when the fragment is a mid fragment or a last fragment, network device 10 may determine the state of the fragment flow for the fragment and may perform one or more actions based at least in part on the state of the fragment flow (104). When network device 10 receives a fragment that is a mid fragment or a last fragment, the fragment flow state may be in one of: a new entry state, a buffer state, an encapsulation state, or a drop state.

As discussed above with respect to FIG. 5B, network device 10 may determine the state of the fragment flow by performing a lookup into flow table 32 to determine whether flow table 32 includes an entry for the particular fragment flow and, if so, determine state of the fragment flow based on the value of the state field in the flow table entry for the fragment flow.

If flow table 32 does not include an entry for the fragment flow, then network device 10 may determine the fragment flow to be in the new entry state regardless of whether the current fragment is a first fragment, a mid fragment, or a last fragment. In response to determining that the fragment is a mid fragment or a last fragment and that the state of the fragment flow is new entry, network device 10 may create an entry for the fragment flow in flow table 32 for the fragment flow (106). Upon creating the entry for the fragment flow in flow table 32, network device 10 may update the values of one or more fields of the entry. Because network device 10 has not received the first fragment of the fragment flow, the fragment flow state transitions from a new entry state to a buffer state when the network device 10 receives a mid fragment or a last fragment of the fragment flow. Thus, network device 10 may set the value of the state field of the entry for the fragment flow in flow table 32 to indicate a buffer state. Network device 10 may also set the value of the sent bytes field of the entry in flow table 32 to zero, as network device 10 has not yet encapsulated and dispatched any previous fragments of the fragment flow, and as the fragment flow is currently in the buffer state.

When the fragment received by network device 10 is a last fragment of the fragment flow (e.g., fragment 52N), network device 10 may be able to determine the total size of data sections 45 of all of the fragments of the fragment flow based at least in part on the value of the fragment offset 50D and the value of the total length 50A included in IPv4 header 42 of the last fragment. In one example, the total size of the data sections 45 of all of the fragments of the fragment flow may be determined by adding the value of the total length 50A in IPv4 header 42 the last fragment to the result of multiplying the value of the fragment offset 50D in IPv4 header 42 of the last fragment by eight, and subtracting the result of the sum by the size of the IPv4 header 42 of the last fragment. Network device 10 may update the value of the total bytes field of the entry with the total size of all fragments of the fragment flow that it has determined.

When the fragment flow is currently in the buffer state, network device 10 operates to buffer fragments it receives in the fragment buffer while it remains in the buffer state, instead of encapsulating and forwarding fragments or dropping fragments. Because the fragment flow is now in a buffer state, network device 10 may buffer the fragment in fragment buffer 28 (108). As network device 10 buffers fragments of a fragment flow, network device 10 may update the fragment flow's entry in flow table 32 to reflect the size of the fragments that are currently buffered in fragment buffer 28 of network device 10. Thus, because the mid fragment or the last fragment received by network device 10 is currently the only fragment of the fragment flow being buffered in fragment buffer 28, network device 10 may set the value of the queued bytes field in the entry for the fragment flow in flow table 32 to indicate the result of subtracting the total length specified by total length 50A of IPv4 header 42 the mid fragment or last fragment that it has received and buffered by the size of IPv4 header 42. Upon buffering the fragment in fragment buffer 28, network device 10 may await receipt of additional fragments of the fragment flow at step 82 shown in FIG. 5A.

If the fragment received by network device 10 is a mid fragment or a last fragment of the fragment flow, and if flow table 32 includes an entry for the fragment flow, then the fragment flow is either in a buffer state, an encapsulation state, or a drop state. As discussed above, the state field in the fragment flow's entry in flow table 32 indicates whether the fragment flow is in the buffer state, the encapsulation state, or the drop state. When the fragment flow is in the drop state, network device 10 may drop the fragment it has received (i.e., refrain from forwarding the fragment to IPv6 network 6) (120). Upon dropping the fragment, network device 10 may await receipt of additional fragments of the fragment flow at step 82 shown in FIG. 5A.

When the fragment received by network device 10 is a mid fragment or a last fragment of the fragment flow, if the fragment flow is in a buffer state, network device 10 may buffer the fragment it has received in fragment buffer 28 and may update the fragment flow's entry in flow table 32 (110). Network device 10 may update the queued bytes field in the entry to add the result of subtracting the value indicated by total length 50A of IPv4 header 42 of the current fragment being buffered by the size of IPv4 header 42 of the fragment to the current value of the queued bytes field. If the fragment is a last fragment of the fragment flow, network device 10 may also be able to determine the total size of all fragments of the fragment flow based at least in part on the value of fragment offset 50D and the value of total length 50A of the last fragment, as discussed above, and may update the value of the total bytes field of the entry with the total size of data sections 45 of all fragments of the fragment flow that it has determined. Upon buffering the fragment in fragment buffer 28, network device 10 may await receipt of additional fragments of the fragment flow at step 82 shown in FIG. 5A.

The fragment flow is in an encapsulation state if network device 10 has previously received the first fragment of the fragment flow. When the fragment is a mid fragment or a last fragment of the fragment flow, and if the fragment flow is in an encapsulation state, network device 10 may be able to encapsulate the fragment it has received within IPv6 network packet 60 and dispatch IPv6 network 60 to IPv6 network 6 without buffering the fragment in fragment buffer 28. Network device 10 may encapsulate the fragment using MAP-E (112) and to dispatch the encapsulated fragment to IPv6 network 6 (114). As part of encapsulating the fragment using MAP-E, network device 10 may determine an IPv6 destination address based at least in part by the destination address and the destination port specified by the fragment flow.

When network device 10 encapsulates and dispatches a fragment of the fragment flow, network device 10 may update the sent bytes field in the entry for the fragment flow in flow table 32 to add the total length of the fragment encapsulated and dispatched by network device 10 to the current value of the sent bytes field. If the fragment is a last fragment of the fragment flow, network device 10 may also be able to determine the total size of all fragments of the fragment flow based at least in part on the value of fragment offset 50D and the value of total length 50A in IPv4 header 42 of the last fragment, as discussed above, and may update the value of the total bytes field of the entry with the total size of data sections 45 of all fragments of the fragment flow that it has determined.

In response to encapsulating and dispatching the fragment, network device 10 may determine whether to delete the entry for the fragment flow in flow table 32 (116). Network device 10 may delete the entry for the fragment flow in flow table 32 if it has encapsulated and dispatched every fragment of the fragment flow. Network device 10 may determine it has encapsulated and forwarded all fragments of the fragment flow if the amount of data (e.g., data sections 45) it has sent to forward fragments of the fragment flow is equal to the total size of data sections 45 all of the fragments of the fragment flow. Network device 10 may determine if the value of the total bytes field of the entry for the fragment flow is greater than zero and if the value of the total bytes field is equal to the value of the sent bytes field. If so, network device 10 may determine that it has encapsulated and forwarded all fragments of the fragment flow and may delete the entry for the fragment flow, thus ending the buffering, encapsulating, and forwarding of fragments performed by network device 10 for the particular fragment flow (118). If network device 10 determines it has not encapsulated and forwarded all fragments of the fragment flow, network device 10 may refrain from deleting the entry for the fragment flow from flow table 32, and may await receipt of additional fragments of the fragment flow at step 82 shown in FIG. 5A.

In addition to forwarding fragments 52 of an IPv4 network packet 40 to IPv6 network 6, network device 10 may also forward fragments 52 encapsulated within IPv6 network packets 60 from IPv6 network 6 to IPv4 network 4. As part of forwarding the encapsulated fragments 52, network device 10 may perform an anti-spoof check on each of the fragments 52 that it receives to determine whether the values of source address 50F and source port 50H in each fragment are each within a respective acceptable range. If the values of source address 50F and source port 50H of a fragment are each within a respective acceptable range, then the fragment passes the anti-spoof check. However, if at least one of the values of source address 50F and source port 50H of a fragment is not within a respective acceptable range, then the fragment fails the anti-spoof check.

Because IPv4 network packet 40 uses an address plus port technique for packet routing, where the source address 50F specified by IPv4 network packet 40 is extended by at least a portion of the source port 50H specified by IPv4 network packet 40, and the destination addresses 50G specified by IPv4 network packet 40 is extended by at least a portion of the destination port 50I specified by the IPv4 network packet 40, network device 10 may not be able to perform anti-spoof checks on the fragments it has received until it receives a fragment of the fragment flow that includes source port 50H. In some examples, only the first fragment of a fragment includes source port 50H.

However, network device 10 may not necessarily receive an IPv6 network packet that encapsulates the first fragment before it receives IPv6 network packets that encapsulate other fragments of fragments 52. If network device 10 receives one or more IPv6 network packets that encapsulate one or more fragments of fragments 52 other than the first fragment before network device 10 receives an IPv6 network packet that encapsulates the first fragment, network device 10 may not be able to perform anti-spoof checks on the one or more fragments of fragments 52 that it has received. Instead, network device 10 may decapsulate the one or more fragments from the one or more IPv6 network packets and may buffer the one or more fragments in fragment buffer 28 until it receives an IPv6 network packet that encapsulates the first fragment.

When network device 10 receives an IPv6 network packet that encapsulates the first fragment of the fragment flow, network device 10 may be able to perform anti-spoof checks on the first fragment as well as any fragments of the fragment flow that is already stored in fragment buffer 28 based at least in part on source port 50H included in the first fragment. Network device 10 may utilize IPv6 header 62 to encapsulate fragment 52A and the one or more fragments stored in fragment buffer 28 into IPv6 network packets 60, and dispatch IPv6 network packets 60 to IPv6 network 6. In some examples, network device 10 may perform anti-spoof checks if anti-spoof checks are enabled in network device 10. If anti-spoof checks are not enabled in network device 10, network device 10 may refrain from performing anti-spoof checks when forwarding fragments 52 of the fragment flow to IPv4 network 4.

Figure 6:
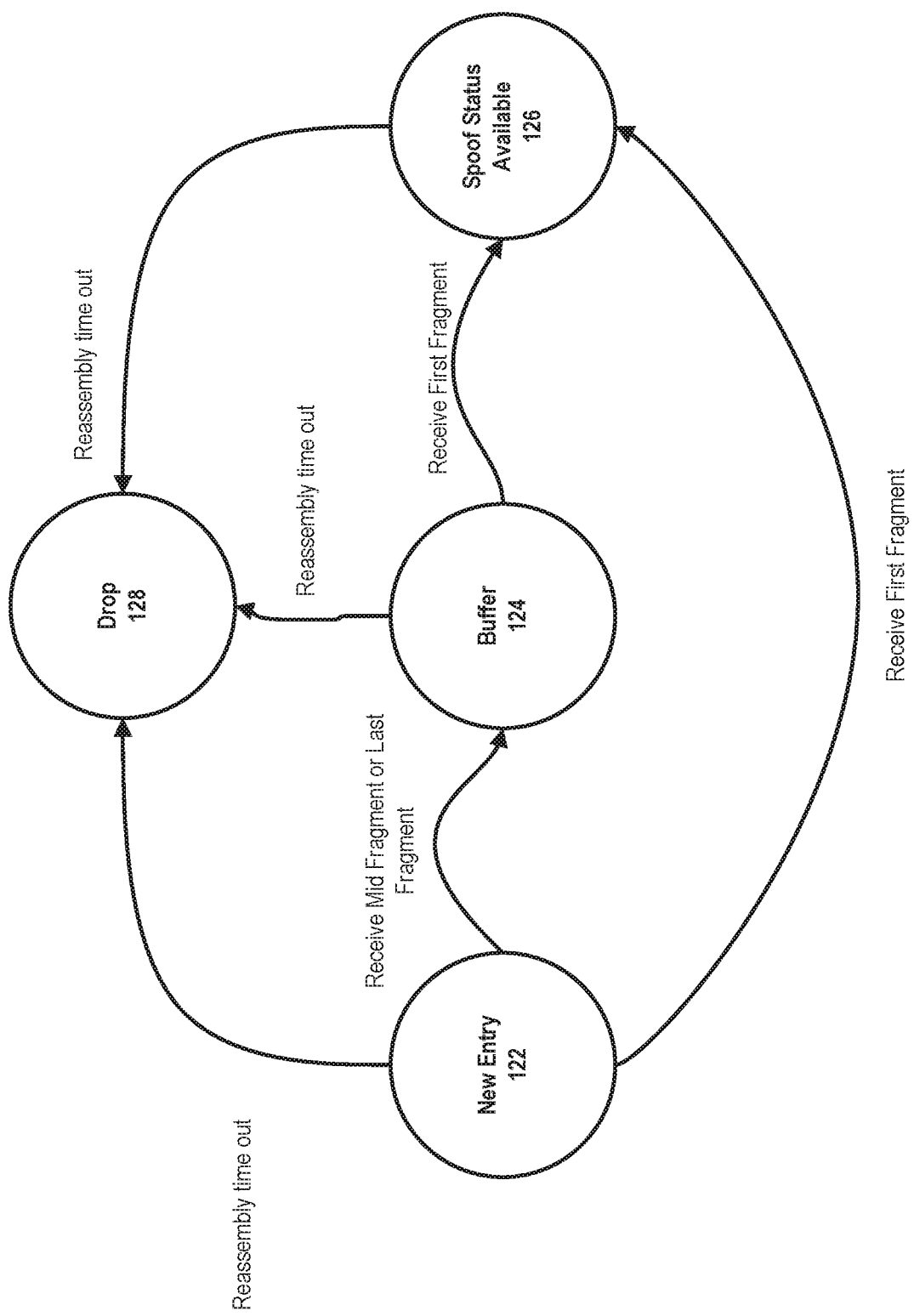
FIG. 6 is a block diagram illustrating the state transitions of an example fragment flow for performing anti-spoof checks on fragments of the fragment flow, according to the techniques described herein.

As network device 10 receives and decapsulates and performs anti-spoof checks on fragments 52 of a fragment flow, the fragment flow may transition between different states. FIG. 6 is a block diagram illustrating the state transitions of an example fragment flow for performing anti-spoof checks on fragments of the fragment flow, according to the techniques described herein. As shown in FIG. 6, the state of a fragment flow may be new entry state 122, buffer state 124, spoof status available state 126, or drop state 128. New entry state 122 indicates that network device 10 has yet to receive any IPv6 network packets 60 that encapsulate fragments 52 of the fragment flow. Buffer state 124 indicates that network device 10 is currently buffering fragments 52 that it has decapsulated from IPv6 network packets 60, but cannot yet perform anti-spoof checks on any of the received fragments 52. Spoof status available state 126 indicates that the network device 10 is currently able to perform anti-spoof checks on any fragments 52 that it has decapsulated. Drop state 128 indicates that network device 10 is currently dropping any fragments 52 that it decapsulates.

A fragment flow is in new entry state 122 until it receives an IPv6 network packet that encapsulates a fragment of the fragment flow. When the fragment flow is in new entry state 122, the fragment flow may transition to buffer state 124 when network device 10 receives an IPv6 network packet that encapsulates a mid fragment or a last fragment of the fragment of flows, or may transition to spoof status available state 126 if network device 10 receives an IPv6 network packet that encapsulates a first fragment of the fragment flow. When the fragment flow is in buffer state 124, network device 10 is unable to perform anti-spoof checks on any fragments 52 of the fragment flow it receives. Instead, network device 10 may decapsulate fragments from IPv6 network packets it receives, and may store fragments it has received in fragment buffer 28. When network device 10 receives and decapsulates additional mid fragments or the last fragment of the fragment flow when the fragment flow is in buffer state 124, the fragment flow may remain in buffer state 124 and network device 10 may store the fragments it has decapsulated in fragment buffer 28.

Regardless of whether the fragment state is in new entry state 122 or buffer state 124, when network device 10 receives a first fragment of the fragment flow, network device 10 is able to transition to spoof status available state 126. When the fragment flow is in spoof status available state 126, network device 10 has received and decapsulated the first fragment of the fragment flow that includes an indication of the source port of IPv4 network packet 40 associated with the fragment flow. Thus, network device 10 is now ready to perform anti-spoof checks on fragments 52 that it has received in IPv6 network packets 60. Network device 10 may forward all fragments 52 that pass the anti-spoof check to IPv4 network 4 and may drop all fragments 52 that fail the anti-spoof check.

When network device 10 receives additional fragments 52 while the fragment flow is in spoof status available state 126, network device 10 may perform anti-spoof checks on the additional fragments 52 it receives without buffering the additional fragments 52 in fragment buffer 28 and without reassembling IPv4 network packet 40 from the additional fragments 52.

When the fragment is in new entry state 122, buffer state 124, or encapsulation state 126, the fragment flow may transition to a drop state 128 when the time elapsed for processing fragments 52 exceeds a reassembly time out or when an error occurs in processing of the fragment flow. A reassembly time out in some examples may be 30 seconds, 45 seconds, or any other suitable value. When the fragment flow is in drop state 128, network device 10 may drop any fragments 52 that it receives. Dropping a fragment may include network device 10 refraining from encapsulating or forwarding fragments 52 to IPv6 network 6.

FIGS. 7A-D is a flowchart illustrating an example process for decapsulating fragments of an IPv4 packet from IPv6 packets and performing anti-spoof checks on the fragments without reassembling the IPv4 packet, according to techniques described herein. Such a process can be performed by a network device that is connected to an IPv4 network and an IPv6 network, such as network device 10 shown in FIGS. 1 and 2 that is connected to IPv4 network 4 and IPv6 network 6. As shown in FIG. 6A, network device 10 may receive an IPv6 network packet, such as one of IPv6 network packets 60, that encapsulates a fragment of an IPv4 network packet, such as one of fragments 52 of IPv4 network packet 40, from IPv4 network 4 (130). In response, network device 10 may decapsulate the fragment of the IPv4 network packet 40 from the IPv6 network packet it receives (132). For example, IFCs 22 of network 10 may receive the IPv6 network packet and packet module 30 of network device 10 may decapsulate the fragment from the IPv6 network packet.

Every fragment of the same IPv4 network packet may be part of the same fragment flow. As discussed throughout this disclosure, network device 10 may, for a fragment flow, buffer every fragment that it receives and decapsulates until it receives a first fragment of the flow. Once network device 10 receives and decapsulate the first fragment of the flow, it has the necessary information, such as the source port, to perform an anti-spoof check of each of the fragments of the fragment flow that it has received. Thus, network device 10 may determine the type of action to take in response to receiving and decapsulating a fragment based at least in part on the type of the fragment. Further, as discussed above with respect to FIG. 4, the type of action that network device 10 takes in response to receiving a fragment may also be based at least in part on the state of the fragment flow.

As such, when network device 10 receives and decapsulates a fragment, network device 10 may determine the fragment type of the fragment as well as the state of the fragment flow of the fragment in order to determine an action to perform in response to receiving the fragment. Network device 10 may determine the fragment type of a fragment as being one of: a first fragment (e.g., fragment 52A), a mid fragment (e.g., fragment 52B), or a last fragment (e.g., fragment 52N) of the fragment flow based at least in part on information contained in the fragment (134). For example, packet module 30 of network device 10 may determine the fragment type of the fragment.

Network device 10 may determine whether the fragment is a first fragment, mid fragment, or last fragment of the fragment flow based at least in part on the fragment offset 50D and flag 50C in IPv4 header 42 of the fragment. For example, network device 10 may determine that the fragment is a first fragment of the fragment flow if the value of fragment offset 50D is equal to zero and if the More Fragments flag in flags 50C is set. Network device 10 may determine that the fragment is a mid fragment if the value of fragment offset 50D is non-zero and the More Fragments flag in flags 50C is set. Network device 10 may determine that the fragment is a last fragment if the value of fragment offset 50D is non-zero and the More Fragments flag in flags 50C is not set.

Besides determining the type of the fragment, network device 10 may also determine the state of the fragment flow at the time network device 10 receives the fragment. The state of the fragment flow may also inform network device 10 as to the action it takes in response to receiving the fragment. When network device 10 is to perform anti-spoof checks on fragments of a fragment flow, the fragment flow may be in one of four states: new entry, buffer, spoof status available, or drop. A fragment flow may be in a new entry state when network device 10 has not yet received any fragments of the fragment flow. A fragment flow may be in a buffer state when it has received one or more fragments of the fragment flow, but has yet to receive the first fragment of the fragment flow that includes an indication of the source port. A fragment flow may be in a spoof status available state when it has received the first fragment of the fragment flow that includes an indication of the source port. A fragment flow may be in a drop state when each fragment of the fragment flow is to be dropped by network device 10. For example, packet module 30 of network device 10 may determine the state of the fragment flow.

When the fragment flow is in a buffer state, network device 10 may be able to buffer in fragment buffer 28 any fragments of the fragment flow that it receives and decapsulates, but may not be able to perform anti-spoof checks on the fragments it has received. When the flow state is in a spoof status available state, network device 10 may be able to perform anti-spoof checks on fragments of the fragment flow that it has received. When the fragment flow is in a drop state, network device 10 may drop any fragments of the fragment flow that it receives.

Figure 7A:
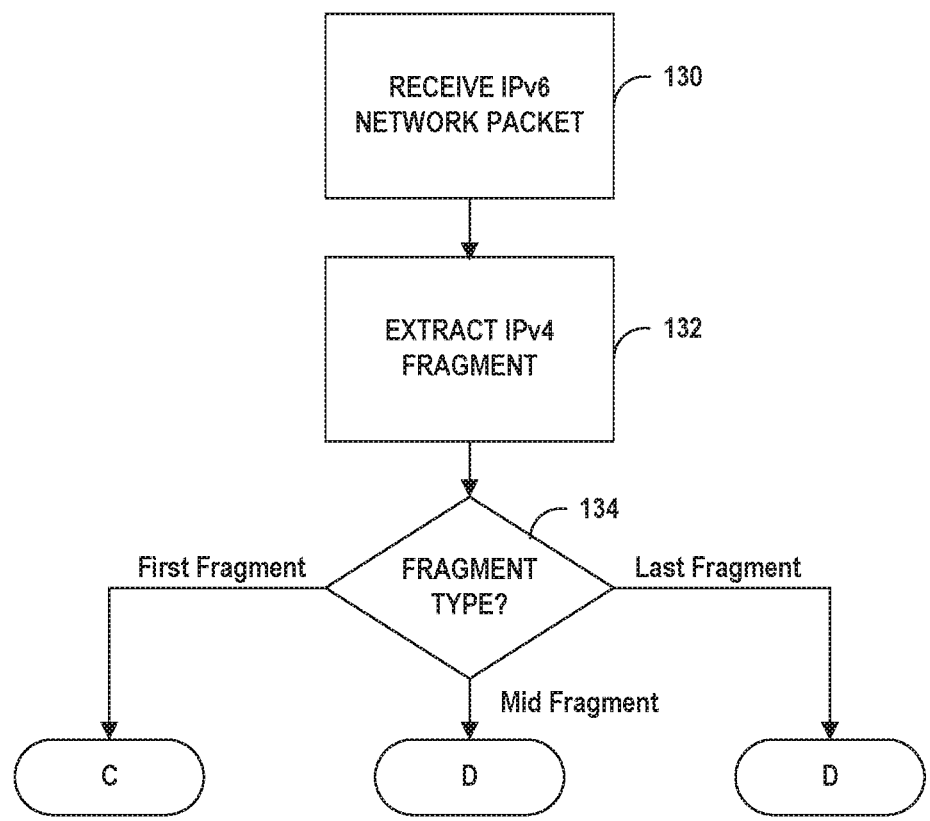
FIGS. 7A-7D depict a flowchart illustrating an example process for decapsulating fragments of an IPv4 packet from IPv6 packets and performing anti-spoof checks on the fragments without reassembling the IPv4 packet, according to techniques described herein.
Figure 7B:
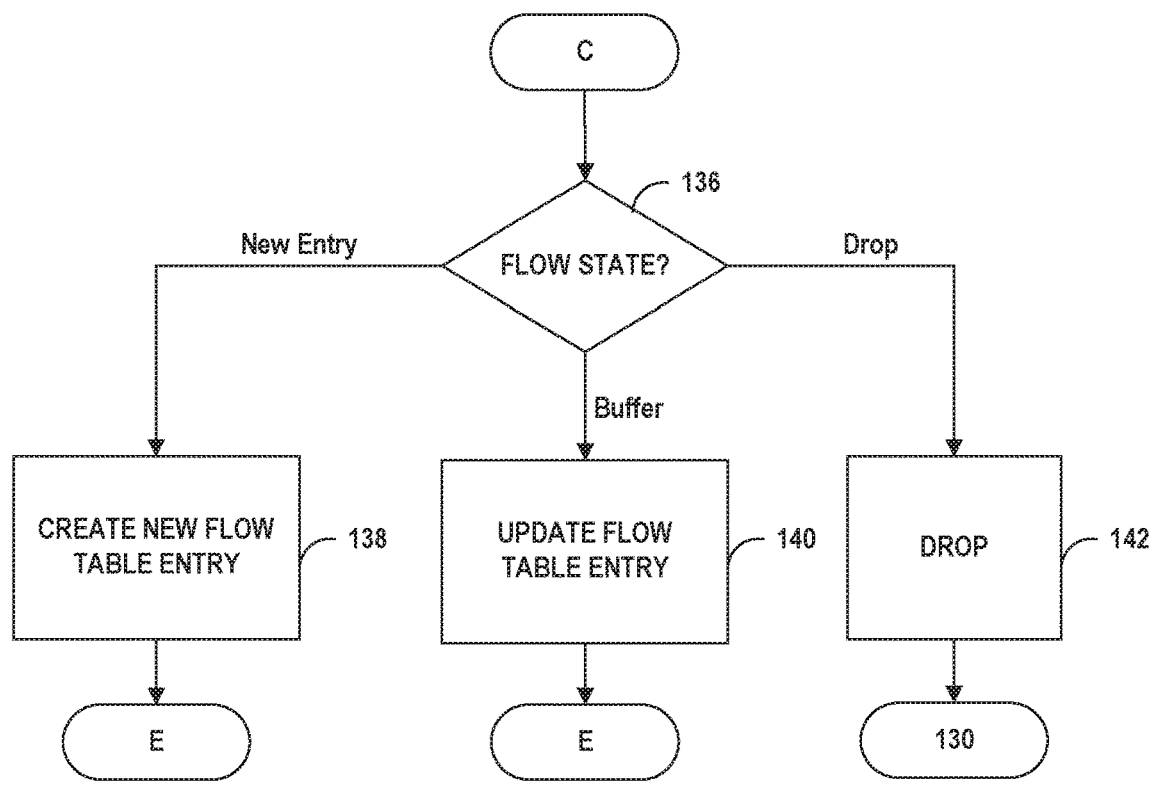

As shown in FIG. 7B, when the fragment is a first fragment, network device 10 may determine the fragment flow for the fragment to be in one of the following flow states: new entry, buffer, or drop. (136). Because network device 10 cannot perform anti-spoof checks on fragments of the fragment flow until it has received the first fragment of the fragment flow, the fragment flow cannot be in a spoof status available state until network device 10 receives the first fragment of the fragment flow. While FIGS. 7A and 7B illustrates that the fragment's type is determined before determining the state of the fragment flow for the fragment, it should be understood that such determinations may occur in any order, or may occur simultaneously. For example, network device 10 may determine the state of the fragment flow for the fragment prior to determining the fragment type of the fragment.

Network device 10 may determine the state of the fragment flow by performing a lookup into flow table 32 to determine whether flow table 32 includes an entry for the particular fragment flow and, if so, determine the value of the state field of the flow table entry for the fragment flow. Network device 10 may perform the lookup into flow table 32 by indexing into flow table 32 using a key that network device 10 may generate based at least in part on the contents of the IPv6 network packet that encapsulates the fragment. Because each IPv6 network packet that encapsulates a fragment may include IPv6 header 62 and IPv4 header 42, network device 10 may generate the key based at least in part on at least a portion of IPv6 header 72 and at least a portion of IPv4 header 42. In one example, network device 10 may generate the key based at least in part on IPv6 source address and IPv6 destination address contained in IPv6 header 62 and fragment ID, source address, destination address, and protocol ID contained in IPv4 header 42 because they may uniquely identify the fragment flow compared with other fragment flows. For example, network device 10 may hash the IPv6 source address, IPv6 destination address, fragment ID, source address, destination address, and protocol ID to generate a key that is used to index into flow table 32 to lookup the flow table entry for the fragment flow.

Network device 10 may determine the fragment flow to be in the new entry state when flow table 32 does not include an entry for the fragment flow. In response to determining that the fragment received and decapsulated by network device 10 is a first fragment, and that the state of the fragment flow is new entry, network device 10 may create an entry for the fragment flow in flow table 32 for the fragment flow (138). As discussed above, an entry for the fragment flow in flow table 32 may include fields such as state, source port, sent bytes, queued bytes, total bytes, dropped bytes, and timer. Because the first fragment includes an indication of the source port, network device 10 may update the source port field in the entry to the source port indicated by the first fragment. Further, when network device 10 receives the first fragment of the fragment flow, network device 10 may transition the fragment flow from new entry state to spoof status available state by setting the state field of the entry to a value that indicates the spoof status available state. Because network device 10 can perform anti-spoof checks once it receives the first fragment, network device 10 may proceed to perform anti-spoof check on the fragment it has received and decapsulated, as shown in further detail in FIG. 7D.

Figure 7C:
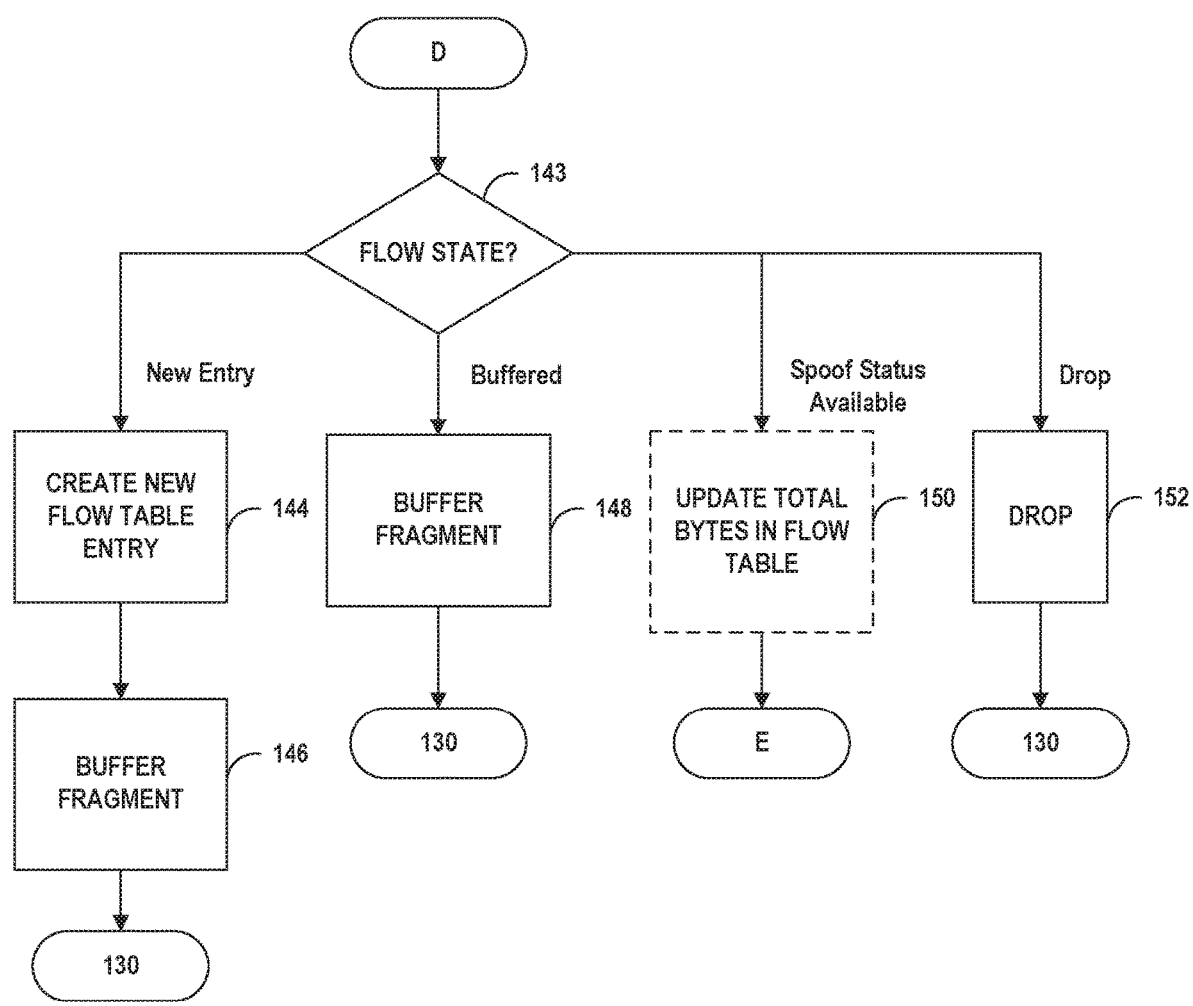
Figure 7D:
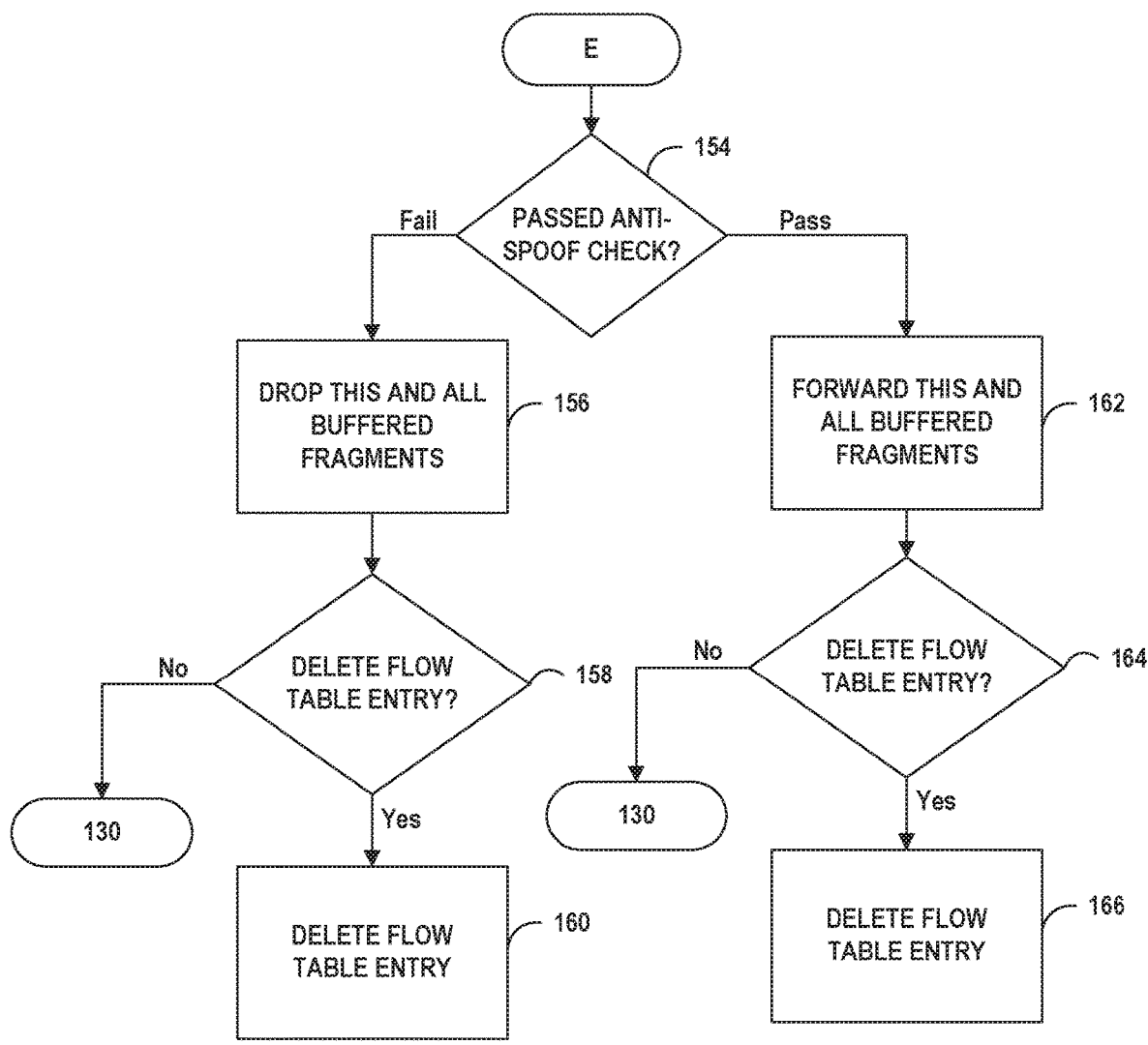

As shown in FIG. 7D, network device 10 may perform an anti-spoof check on the fragment it has received by determining whether the source address and the source port associated with the fragment flow of the fragment range are each within an acceptable range (154). For example, packet module 30 of network device 10 may perform the anti-spoof check on the fragment. Network device 10 may retrieve the source address from the source address field of the fragment flow's entry in flow table 32 and may determine whether the source address is within an acceptable range. Network device 10 may also retrieve the source port from the source port field of the fragment flow's entry in flow table 32 and may determine whether the source address is within an acceptable range.

If the source address and the source port are both within acceptable ranges, then the fragment passes the anti-spoof check. If either the source address or the source port is not within an acceptable range, the fragment fails the anti-spoof check. If the fragment fails the anti-spoof check, network device 10 may drop the fragment as well as all previously received fragments of the same fragment flow that are currently being buffered in fragment buffer 28 (156).

When the fragment fails the anti-spoof check, network device 10 may update the fragment flow's entry in flow table 32. Network device 10 may set the value of the dropped bytes field as the total size of data sections 45 of the fragments that network device 10 has dropped. Because network device 10 drops the fragment as well as all previously received fragments of the same fragment flow that are currently being buffered in fragment buffer 28, network device 10 may set the value of the dropped bytes field to the sum of the value of the queued bytes field and the value of total length 50A in IPv4 header 42 of the fragment specified by total length 50A in the fragment minus the size of IPv4 header 42. Network device 10 may also set the values of the sent bytes field and the queued bytes field to zero.

Network device 10 may determine whether it should delete the fragment flow's entry in flow table 32. Network device 10 may delete the fragment flow's entry if it has received every fragment making up the fragment flow (158). Because the fragment has failed the anti-spoof check, network device 10 should have dropped every fragment of the fragment flow it has received. If network device 10 has received and dropped every fragment of the fragment flow, the total size of all of the fragments it has dropped should be the same as the total size of all of the fragments of the fragment flow.

Thus, network device 10 may determine if it has received every fragment of the fragment flow by comparing the value of the total bytes field to the dropped bytes field. If the value of the total bytes field is greater than zero, and if the value of the total bytes field equals the value of the dropped bytes field, then network device 10 may determine it has received every fragment of the fragment flow, and may delete the fragment flow's entry in flow table 32 (160). On the other hand, if network device 10 determines it has not yet received every fragment of the fragment flow, network device 10 may refrain from deleting the fragment flow's entry in flow table 32 and may instead await receipt of additional IPv6 network packets 60 that carry fragments of the fragment flow at step 130 shown in FIG. 7A.

When the fragment passes the anti-spoof check, network device 10 may forward the fragment as well as all previously received fragments of the same fragment flow that are currently being buffered in fragment buffer 28 to IPv4 network 4 (162). Network device 10 may also set the value of the sent bytes field as the total size of data sections 45 of the fragments that network device 10 has sent to IPv4 network 4. Because network device 10 sends to IPv4 network 4 the fragment as well as all previously received fragments of the same fragment flow that are currently being buffered in fragment buffer 28, network device 10 may set the value of the sent bytes field to the sum of the value of the queued bytes field and the value of total length 50A in IPv4 header 42 of the fragment minus the size of IPv4 header 42. Network device 10 may also set the values of the queued bytes field to zero.

Network device 10 may determine whether it should delete the fragment flow's entry in flow table 32. Network device 10 may delete the fragment flow's entry if it has received every fragment making up the fragment flow (164). Because the fragment has passed the anti-spoof check, network device 10 should have forwarded every fragment of the fragment flow it has received. If network device 10 has received and forwarded every fragment of the fragment flow, the total size of all of the fragments it has forwarded should be the same as the total size of all of the fragments of the fragment flow.

Thus, network device 10 may determine if it has received every fragment of the fragment flow by comparing the value of the total bytes field to the sent bytes field. If the value of the total bytes field is greater than zero, and if the value of the total bytes field equals the value of the sent bytes field, then network device 10 may determine it has received every fragment of the fragment flow, and may delete the fragment flow's entry in flow table 32 (166). On the other hand, if network device 10 determines it has not yet received every fragment of the fragment flow, network device 10 may refrain from deleting the fragment flow's entry in flow table 32 and may instead await receipt of additional IPv6 network packets 60 that carry fragments of the fragment flow at step 130 shown in FIG. 7A.

Network device 10 may only have to perform the anti-spoof check once for a particular fragment flow, because the fragment flow comprises the fragments of a single IPv4 network packet that specifies a single IPv4 source address and a single source port. Thus, if one fragment of a fragment flow passes the anti-spoof check, then other fragments of the fragment flow will also pass the anti-spoof check. Conversely, if one fragment of a fragment flow fails the anti-spoof check, then other fragments of the fragment flow will also fail the anti-spoof check. Thus, once network device 10 has performed an anti-spoof check for a fragment flow, network device 10 may determine whether to forward or to drop the remaining fragments of the fragment flow based on whether the fragment flow has previously passed or failed the anti-spoof check.

Referring back to FIG. 7B, if the current fragment is a first fragment of the fragment flow, and if flow table 32 includes an entry for the fragment flow, then the state field of the entry for the format flow may indicate whether the fragment flow is in a buffer state or whether the state of the fragment flow is in a drop state. As discussed above, a fragment flow may be in a buffer state when network device 10 has already received and buffered one or more fragments of the fragment flow.

In response to determining that the current fragment is a first fragment of the fragment flow, and that the fragment flow is in a drop state, network device 10 may drop the fragment (i.e., refrain from forwarding the fragment to IPv4 network 4) (142). In response to dropping the fragment, network device 10 may await receipt of additional IPv6 network packets 60 that carry fragments of the fragment flow at step 130 shown in FIG. 7A.

In response to determining that the current fragment is a first fragment of the fragment flow, and that the fragment flow is in a buffer state, network device 10 may transition the fragment flow from the buffer state to the spoof status available state and may update the entry for the fragment flow in flow table 32 based on the first fragment (140). Network device 10 may update the value of the state field of the fragment flow from indicating a buffer state to indicating a spoof status available state and update the value of the source port field in the entry to indicate the source port indicated by the first fragment. Because receiving the first fragment of the fragment flow enables network device 10 to forward the fragments of the fragment flow it has been buffering to IPv4 network 4, network device 10 may also update the value of the sent bytes field of the entry to indicate current value of the queued bytes field plus the value of total length 50A in IPv4 header 42 of the fragment minus the size of IPv4 header 42. Network device 10 may also set the value of the queued bytes field of the entry to indicate zero due to network device 10 being able to forward the fragments of the fragment flow it has been buffering. Network device 10 may proceed to perform anti-spoof checks on each fragment of the flow that it has buffered, plus the first fragment, as shown in FIG. 7D.

As discussed above, a fragment may be a first fragment, a mid fragment, or a last fragment. As shown in FIG. 7C, when the fragment is a mid fragment or a last fragment, network device 10 may determine the state of the fragment flow for the fragment and may perform one or more actions based at least in part on the state of the fragment flow (143). When network device 10 receives a fragment that is a mid fragment or a last fragment, the fragment flow state may be in one of: a new entry state, a buffer state, a spoof status available state, or a drop state.

As discussed above with respect to FIG. 7B, network device 10 may determine the state of the fragment flow by performing a lookup into flow table 32 to determine whether flow table 32 includes an entry for the particular fragment flow and, if so, determine state of the fragment flow based on the value of the state field in the flow table entry for the fragment flow.

If flow table 32 does not include an entry for the fragment flow, then network device 10 may determine the fragment flow to be in the new entry state regardless of whether the current fragment is a first fragment, a mid fragment, or a last fragment. In response to determining that the fragment is a mid fragment or a last fragment and that the state of the fragment flow is new entry, network device 10 may create an entry for the fragment flow in flow table 32 for the fragment flow (144). Upon creating the entry for the fragment flow in flow table 32, network device 10 may update the values of one or more fields of the entry. Because network device 10 has not received the first fragment of the fragment flow, the fragment flow state transitions from a new entry state to a buffer state when the network device 10 receives a mid fragment or a last fragment of the fragment flow. Thus, network device 10 may set the value of the state field of the entry for the fragment flow in flow table 32 to indicate a buffer state. Network device 10 may also set each of the values of the sent bytes field and the dropped bytes field of the entry in flow table 32 to zero, as none of the fragments of the fragment flow has yet to pass or fail the anti-spoof check.

When the fragment received by network device 10 is a last fragment of the fragment flow, network device 10 may be able to determine the total size of data sections 45 of all of the fragments of the fragment flow based at least in part on the value of fragment offset 50D and the value of total length 50A included in IPv4 header 42 of the last fragment. In one example, the total size of data section 45 of all of the fragments of the fragment flow may be determined by adding the value of total length 50A in IPv4 header 42 of the last fragment to the result of multiplying the value of fragment offset 50D in IPv4 header 42 of the last fragment by eight, and subtracting the result of the sum by the size of the IPv4 header 42 of the last fragment. Network device 10 may update the value of the total bytes field of the entry with the total size of all fragments of the fragment flow. When the fragment received by network device 10 is a mid fragment, network device 10 may set the value of the total size field to zero.

When the fragment flow is currently in the buffer state, network device 10 operates to buffer fragments it receives in the fragment buffer while it remains in the buffer state. Because the fragment flow is now in a buffer state, network device 10 may buffer the fragment in fragment buffer 28 (146). As network device 10 buffers fragments of a fragment flow, network device 10 may update the fragment flow's entry in flow table 32 to reflect the size of the data sections 45 of the fragments that are currently buffered in fragment buffer 28 of network device 10. Thus, because the mid fragment or the last fragment received by network device 10 is currently the only fragment of the fragment flow being buffered in fragment buffer 28, network device 10 may set the value of the queued bytes field in the entry for the fragment flow in flow table 32 to indicate the value of total length 50A of IPv4 header 42 of the mid fragment or last fragment that it has received and buffered minus the size of IPv4 header 42. Upon buffering the fragment in fragment buffer 28, network device 10 may await receipt of additional fragments of the fragment flow at step 130 shown in FIG. 7A.

If the fragment received by network device 10 is a mid fragment or a last fragment of the fragment flow, and if flow table 32 includes an entry for the fragment flow, then the fragment flow is either in a buffer state, a spoof status available state, or a drop state. As discussed above, the state field in the fragment flow's entry in flow table 32 indicates whether the fragment flow is in the buffer state, the spoof status state, or the drop state. When the fragment flow is in the drop state, network device 10 may drop the fragment it has received (i.e., refrain from performing anti-spoof checks on the fragments or forwarding the fragment to IPv4 network 4) (152). Upon dropping the fragment, network device 10 may await receipt of additional fragments of the fragment flow at step 130 shown in FIG. 7A.

When the fragment received by network device 10 is a mid fragment or a last fragment of the fragment flow, if the fragment flow is in a buffer state, network device 10 may buffer the fragment it has received in fragment buffer 28 and may update the fragment flow's entry in flow table 32 (148). Network device 10 may update the queued bytes field in the entry to add the value of total length 50A in IPv4 header 42 of the current fragment being buffered subtracted by the size of IPv4 header 42 to the current value of the queued bytes field. If the fragment is a last fragment of the fragment flow, network device 10 may also be able to determine the total size of all fragments of the fragment flow based at least in part on the value of fragment offset 50D and the value of total length 50A in IPv4 header 42 of the last fragment, as discussed above, and may update the value of the total bytes field of the entry with the total size of the data sections 45 of all fragments of the fragment flow that it has determined. Upon buffering the fragment in fragment buffer 28, network device 10 may await receipt of additional fragments of the fragment flow at step 130 shown in FIG. 7A.

The fragment flow is in a spoof status state if network device 10 has previously received the first fragment of the fragment flow. When the fragment is a last fragment of the fragment flow, network device 10 may update the queued bytes field in the entry to add the value of total length 50A in IPv4 header 42 of the current fragment being buffered subtracted by the size of IPv4 header 42 to the current value of the queued bytes field, and may also be able to determine the total size of data sections 45 of all fragments of the fragment flow based at least in part on the value of fragment offset 50D and the value of total length 50A in IPv4 header 42 of the last fragment, as discussed above, and may update the value of the total bytes field of the entry with the total size of data sections 45 of all fragments of the fragment flow that it has determined (150). When the fragment is a mid fragment or a last fragment of the fragment flow, and if the fragment flow is in a spoof status state, network device 10 may perform anti-spoof check on the fragment it has received and decapsulated, as shown in further detail in FIG. 7D. In this way, network device 10 may be able to receive IPv6 network packets 60 that encapsulate fragments 52, decapsulate the fragments 52 from IPv6 network packets 60, and perform anti-spoof checks on each of fragments 52 without reassembling IPv4 network packet 40 from fragments 52.

Figure 8:
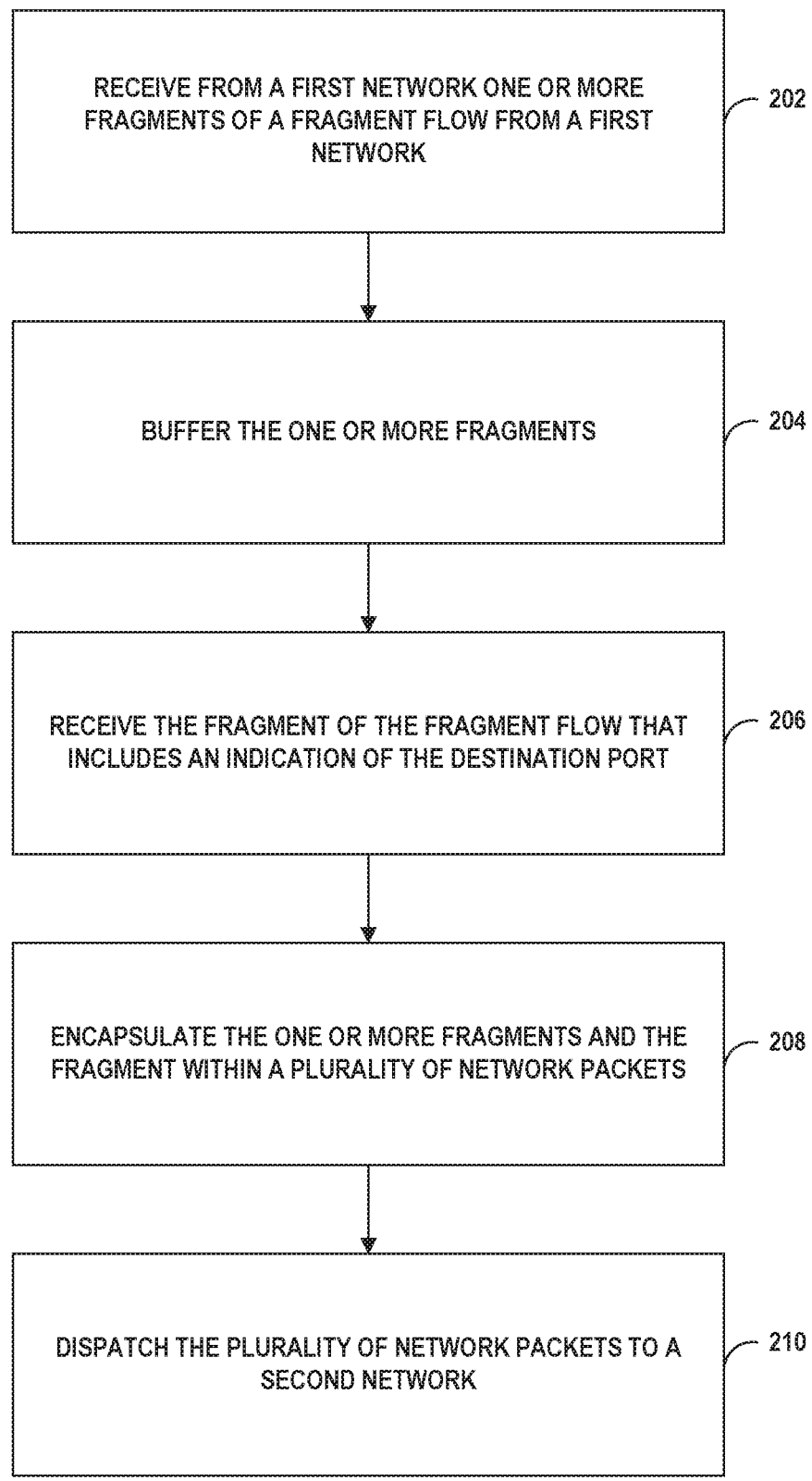
FIG. 8 is a flowchart illustrating an example process for encapsulate IPv4 packets in IPv6 packets without reassembling the IPv4 packets, according to techniques described herein.

FIG. 8 is a flowchart illustrating an example process for encapsulate IPv4 packets in IPv6 packets without reassembling the IPv4 packets, according to techniques described herein. Such a process can be performed by a network device that is connected to an IPv4 network and an IPv6 network, such as network device 10 shown in FIGS. 1 and 2 that is connected to IPv4 network 4 and IPv6 network 6. As shown in FIG. 8, network device 10 may receive, from a first network, one or more fragments of a fragment flow associated with a network packet, wherein the network packet is a first type of network packet (202). In some examples, the first network may be IPv4 network 4, and the first type of network packet may be IPv4 network packet 40.

Network device 10 may, in response to determining that the network device 10 has not yet received a fragment of the fragment flow that includes an indication of a destination port for the network packet, buffer the one or more fragments (204). In some examples, the destination port may be IPv4 destination port 50I, and network device 10 may buffer the one or more fragments in fragment buffer 28.

Network device 10 may receive the fragment of the fragment flow that includes the indication of the destination port of the network packet (206). In some examples, the fragment received by network device 10 may be fragment 52A that includes destination port 50F.

Network device 10 may, in response to receiving the fragment of the fragment flow that includes the indication of the destination port of the network packet, encapsulate the one or more fragments of the fragment flow and the fragment of the fragment flow within a plurality of network packets based at least in part on the destination port of the network packet without reassembling the network packet from the one or more fragments and the fragment, wherein the plurality of network packets are each a second type of network packet (208). In some examples, the second type of network packet may be IPv6 network packets 60, and network device 10 may perform the techniques of MAP-E to encapsulate the one or more fragments of the fragment flow.

Network device 10 may dispatch, to a second network, the plurality of network packets (210). For example, network device 10 may forward each packet of the plurality of network packets by outputting packets on an outgoing interface of one of IFCs 22 toward a destination of the packet. In some examples, the second network may be IPv6 network 6.

In some examples, network device 10 may, subsequent to receiving the fragment that includes the indication of the destination port and dispatching the plurality of network packets, receive one or more remaining fragments of the fragment flow. Network device 10 may encapsulate the one or more remaining fragments of the fragment flow within one or more network packets based at least in part on the destination port without buffering the one or more remaining fragments of the fragment flow, wherein the one or more network packets are each the second type of network packet. Network device 10 may dispatch the one or more network packets to the second network.

In some examples, network device 10 may create an entry for the fragment flow in a flow table, such as flow table 32. Network device 10 may, in response to receiving the one or more fragments of the fragment flow that does not include the fragment of the fragment flow that includes the indication of the destination port of the network packet, transition the fragment flow to a buffer state by updating the entry for the fragment in the flow table to indicate that the fragment flow is in the buffer state, wherein the buffer state indicates that the network device has not yet received the indication of the destination port of the network packet. For example, network device 10 may update the state field in the entry for the fragment flow in flow table 32 to indicate a buffer state.

In some examples, network device 10 may, in response to receiving the fragment of the fragment flow that includes the indication of the destination port of the network packet, transition the fragment flow from the buffer state to an encapsulation state by updating the entry for the fragment in the flow table to indicate that the fragment flow is in the encapsulation state, wherein the encapsulation state indicates that the network device is able to encapsulate fragments of the fragment flow based at least in part on the destination port. For example, network device 10 may update the state field in the entry for the fragment flow in flow table 32 to indicate an encapsulation state.

In some examples, network device 10 may determine that the one or more fragments of the fragment flow for the network packet does not include a first fragment of the fragment flow. In some examples, the first fragment of the fragment flow may be fragment 52A. Network device 10 may determine whether the fragment of the fragment flow includes the indication of the destination port of the network packet based at least in part on determining whether the fragment is a first fragment of the fragment flow.

Figure 9:
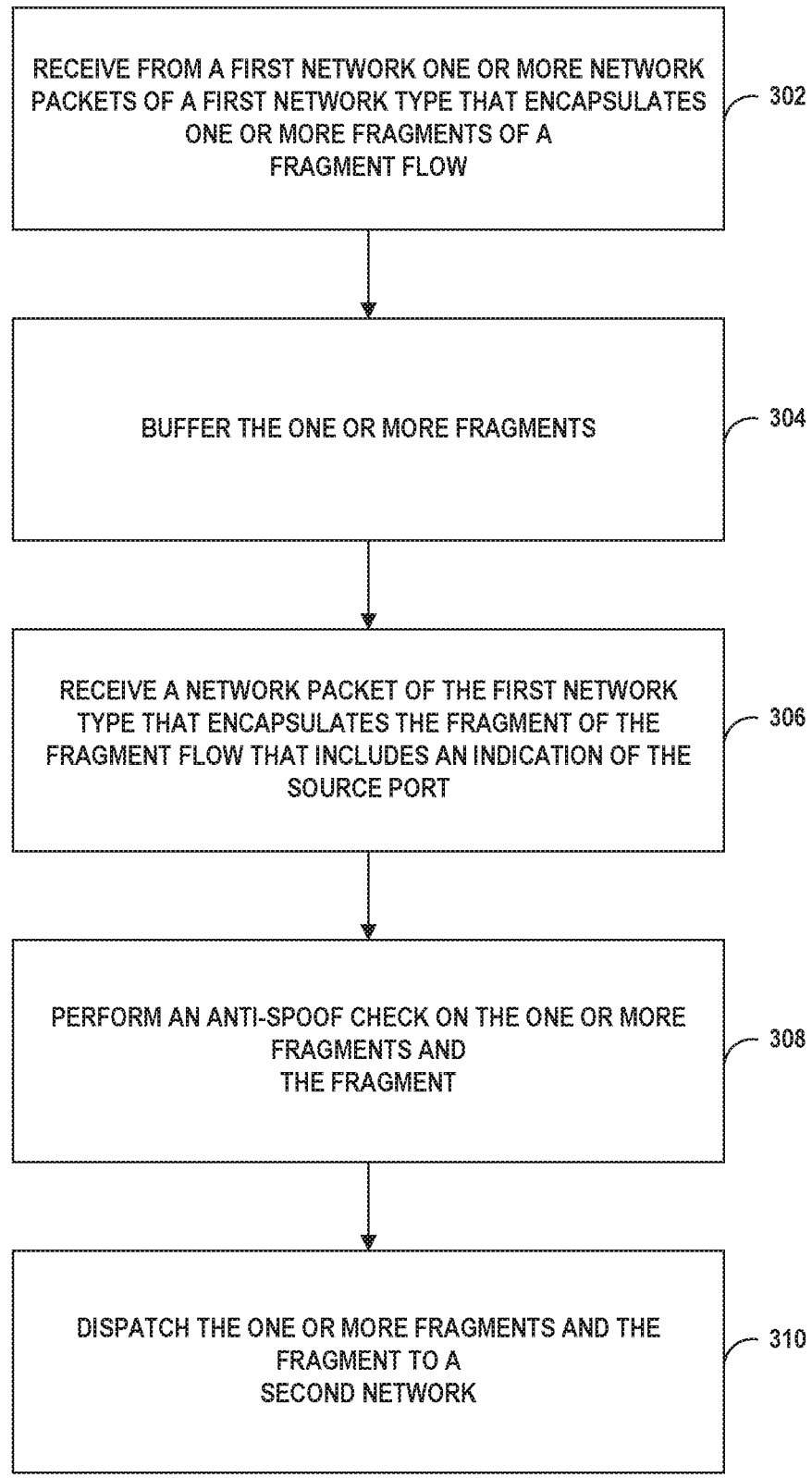
FIG. 9 is a flowchart illustrating an example process for decapsulating fragments of an IPv4 packet from IPv6 packets and performing anti-spoof checks on the fragments without reassembling the IPv4 packet, according to techniques described herein.

FIG. 9 is a flowchart illustrating an example process for decapsulating fragments of an IPv4 packet from IPv6 packets and performing anti-spoof checks on the fragments without reassembling the IPv4 packet, according to techniques described herein. As shown in FIG. 9, network device 10 may receive, from a first network, one or more network packets of a first network packet type, wherein each of the one or more network packets encapsulate a respective one of one or more fragments of a fragment flow associated with a network packet of a second network packet type (302). In some examples, the first network may be IPv6 network 6, the first network packet type may be IPv6 packets 50, the one or more fragments may be one or more of fragments 52, and the second network packet type may be IPv4 network packet 40.

Network device 10 may, in response to determining that the one or more network packets of the fragment flow does not include a fragment of the fragment flow that includes an indication of a source port of the network packet, buffer the one or more fragments of the fragment flow (304). In some examples, the fragment of the fragment flow that includes an indication of a source port of the network packet may be fragment 52A that includes source port 50H, and network device 10 may buffer the one or more fragments of the fragment flow in fragment buffer 28.

Network device 10 may receive a network packet of the first network type that encapsulates the fragment of the fragment flow that includes the indication of the source port of the network packet (306). In some examples, the network packet of the first type may be IPv6 network packet 60A.

Network device 10 may, in response to receiving the network packet of the first network type that encapsulates the fragment of the fragment flow that includes the indication of the source port of the network packet, perform an anti-spoof check on the one or more fragments of the fragment flow and the fragment of the fragment flow based at least in part on the source port of the network packet of the second network packet type without reassembling the network packet of the second network packet type from the one or more fragments of the fragment flow and the fragment of the fragment flow (308).

Network device 10 may, in response to the one or more fragments of the fragment flow and the fragment of the fragment flow passing the anti-spoof check, dispatch, to a second network, the one or more fragments of the fragment flow and the fragment of the fragment flow (310). For example, network device 10 may forward each packet of the plurality of network packets by outputting packets on an outgoing interface of one of IFCs 22 toward a destination of the packet. In some examples, the second network may be IPv4 network 4.

In some examples, network device 10 may, subsequent to receiving the network packet of the first network type that encapsulates the fragment of the fragment flow that includes the indication of the source port of the network packet and the one or more fragments of the fragment flow and the fragment of the fragment flow passing the anti-spoof check, receive a second one or more network packets of the first network packet type, wherein each of the second one or more network packets encapsulates a respective one of one or more remaining fragments of the fragment flow.

In some examples, network device 10 may perform an anti-spoof check on the one or more remaining fragments of the fragment flow without buffering the one or more remaining fragments of the fragment flow. In some examples, network device 10 may, in response to the one or more remaining fragments of the fragment flow passing the anti-spoof check, dispatch, to the second network, the one or more remaining fragments of the fragment flow.

In some examples, network device 10 may create an entry associated with the fragment flow in a flow table, such as flow table 32. Network device 10 may, in response to determining that the one or more fragments of the fragment flow do not include the fragment of the fragment flow that includes the indication of the source port of the network packet of the second network packet type, transition the fragment flow to a buffer state by updating the entry for the fragment in the flow table to indicate that the fragment flow is in the buffer state, wherein the buffer state indicates that the network device has not yet received the indication of the source port of the network packet. For example, network device 10 may update the state field in the entry for the fragment flow in flow table 32 to indicate a buffer state.

In some examples, network device 10 may, in response to determining that the fragment of the fragment flow includes the indication of the source port of the network packet of the second network packet type, transition the fragment flow from the buffer state to a spoof status available state by updating the entry for the fragment in the flow table to indicate that the fragment flow is in the spoof status available state, wherein the spoof status available state indicates that the network device is able to perform anti-spoof checks on the one or more fragments of the fragment flow and the fragment of the fragment flow based at least in part on the source port of the network packet. For example, network device 10 may update the state field in the entry for the fragment flow in flow table 32 to indicate a spoof status available state.

In some examples, network device 10 may determine that the one or more fragments of the fragment flow for the network packet does not include a first fragment of the fragment flow. In some examples, network 10 may determine whether the fragment of the fragment flow includes the indication of the source port of the network packet based at least in part on determining whether the fragment is a first fragment of the fragment flow. In some examples, the first fragment of the fragment flow may be fragment 52A.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
receiving, by a network device from a first network, one or more fragments of a fragment flow associated with a network packet, wherein the network packet is a first type of network packet;
in response to determining that the network device has not yet received a first fragment of the fragment flow that includes an indication of a destination port for the network packet, buffering, by the network device, the one or more fragments;
receiving, by the network device, the first fragment of the fragment flow that includes the indication of the destination port of the network packet;
in response to receiving the first fragment of the fragment flow that includes the indication of the destination port of the network packet, encapsulating, by the network device, each of the one or more fragments of the fragment flow and the first fragment of the fragment flow within a respective network packet of a plurality of network packets of a second type of network packet without reassembling the network packet from the one or more fragments and the first fragment, such that the respective network packet includes a respective packet header and a respective fragment of the fragment flow received by the network device, including generating the respective packet header for each of the plurality of network packets based at least in part on the destination port of the network packet; and
dispatching, by the network device to a second network, the plurality of network packets.

2. The method of claim 1, further comprising:
subsequent to receiving the first fragment that includes the indication of the destination port and dispatching the plurality of network packets, receiving, by the network device, one or more remaining fragments of the fragment flow;
encapsulating, by the network device, the one or more remaining fragments of the fragment flow within one or more network packets based at least in part on the destination port without buffering the one or more remaining fragments of the fragment flow, wherein the one or more network packets are each the second type of network packet;
dispatching, by the network device, the one or more network packets to the second network.

3. The method of claim 1, further comprising:
creating, by the network device, an entry associated with the fragment flow in a flow table;
in response to receiving the one or more fragments of the fragment flow that does not include the first fragment of the fragment flow that includes the indication of the destination port of the network packet, transitioning the fragment flow to a buffer state by updating the entry for the fragment flow in the flow table to indicate that the fragment flow is in the buffer state, wherein the buffer state indicates that the network device has not yet received the indication of the destination port of the network packet; and
in response to receiving the first fragment of the fragment flow that includes the indication of the destination port of the network packet, transitioning the fragment flow from the buffer state to an encapsulation state by updating the entry for the fragment flow in the flow table to indicate that the fragment flow is in the encapsulation state, wherein the encapsulation state indicates that the network device is able to encapsulate fragments of the fragment flow based at least in part on the destination port.

4. The method of claim 1, further comprising:
determining, by the network device, that the one or more fragments of the fragment flow for the network packet does not include the first fragment of the fragment flow; and
determining whether the first fragment of the fragment flow includes the indication of the destination port of the network packet.

5. The method of claim 1, wherein the network device encapsulates each of the one or more fragments of the fragment flow and the first fragment of the fragment flow using mapping of address and port with encapsulation (MAP-E).

6. The method of claim 1, wherein:
the first type of network packet is an Internet Protocol version 4 (IPv4) network packet;
the second type of network packet is an Internet Protocol version 6 (IPv6) network packet; the first network is an IPv4 network; and the second network is an IPv6 network.

7. A network device comprising:
one or more network interfaces configured to receive, from a first network, one or more fragments of a fragment flow associated with a network packet, wherein the network packet is a first type of network packet; and
one or more processors configured to, in response to determining that the network device has not yet received a first fragment of the fragment flow that includes an indication of a destination port for the network packet, buffering the one or more fragments in a fragment buffer;
wherein the one or more network interfaces are further configured to receive the first fragment of the fragment flow that includes the indication of the destination port of the network packet from the first network,
wherein the one or more processors are further configured to, in response to the one or more network interfaces receiving the first fragment of the fragment flow that includes the indication of the destination port of the network packet, encapsulate each of the one or more fragments of the fragment flow and the first fragment of the fragment flow within a respective network packet of a plurality of network packets of a second type of network packet without reassembling the network packet from the one or more fragments and the first fragment, such that the respective network packet includes a respective packet header and a respective fragment of the fragment flow received by the network device, including generating the respective packet header for each of the plurality of network packets based at least in part on the destination port of the network packet, and
wherein the one or more network interfaces are further configured to dispatch the plurality of network packets to a second network.

8. The network device of claim 7,
wherein the one or more network interfaces are further configured to, subsequent to receiving the first fragment that includes the indication of the destination port and dispatching the plurality of network packets, receive one or more remaining fragments of the fragment flow;
wherein the one or more processors are further configured to:
encapsulate the one or more remaining fragments of the fragment flow within one or more network packets based at least in part on the destination port without buffering the one or more remaining fragments of the fragment flow in the fragment buffer, wherein the one or more network packets are each the second type of network packet, and dispatch the one or more network packets to the second network.

9. The network device of claim 7, wherein the one or more processors are further configured to:

create an entry associated with the fragment flow in a flow table;
in response to the one or more network interfaces receiving the one or more fragments of the fragment flow that does not include the first fragment of the fragment flow that includes the indication of the destination port of the network packet, transition the fragment flow to a buffer state by updating the entry associated with the fragment flow in the flow table to indicate that the fragment flow is in the buffer state, wherein the buffer state indicates that the network device has not yet received the indication of the destination port of the network packet; and
in response to the one or more network interfaces receiving the first fragment of the fragment flow that includes the indication of the destination port of the network packet, transition the fragment flow from the buffer state to an encapsulation state by updating the entry associated with the fragment flow in the flow table to indicate that the fragment flow is in the encapsulation state, wherein the encapsulation state indicates that the network device is able to encapsulate fragments of the fragment flow based at least in part on the destination port.

10. The network device of claim 7, wherein the one or more processors are further configured to:
determine that the one or more fragments of the fragment flow for the network packet does not include the first fragment of the fragment flow; and
determine whether the first fragment of the fragment flow includes the indication of the destination port of the network packet.

11. The network device of claim 7, wherein the network device encapsulates each of the one or more fragments of the fragment flow and the first fragment of the fragment flow using mapping of address and port with encapsulation (MAP-E).

12. The network device of claim 7, wherein:
the first type of network packet is an Internet Protocol version 4 (IPv4) network packet;
the second type of network packet is an Internet Protocol version 6 (IPv6) network packet;
the first network is an IPv4 network; and
the second network is an IPv6 network.

13. A non-transitory computer-readable medium comprising instructions for causing a programmable processor of a network device to:
receive, from a first network, one or more fragments of a fragment flow associated with a network packet, wherein the network packet is a first type of network packet;
in response to determining that the network device has not yet received a first fragment of the fragment flow that includes an indication of a destination port for the network packet, buffer the one or more fragments;
receive the first fragment of the fragment flow that includes the indication of the destination port of the network packet;
in response to receiving the first fragment of the fragment flow that includes the indication of the destination port of the network packet, encapsulate each of the one or more fragments of the fragment flow and the first fragment of the fragment flow within a respective network packet of a plurality of network packets of a second type of network packet without reassembling the network packet from the one or more fragments and the first fragment, such that the respective network packet includes a respective packet header and a respective fragment of the fragment flow received by the network device, including generating the respective packet header for each of the plurality of network packets based at least in part on the destination port of the network packet; and dispatch, to a second network, the plurality of network packets.

14. The non-transitory computer-readable medium of claim 13, wherein the instructions further cause the programmable processor to:

subsequent to receiving the first fragment that includes the indication of the destination port and dispatching the plurality of network packets, receive one or more remaining fragments of the fragment flow;

encapsulate the one or more remaining fragments of the fragment flow within one or more network packets based at least in part on the destination port without buffering the one or more remaining fragments of the fragment flow, wherein the one or more network packets are each the second type of network packet;

dispatch the one or more network packets to the second network.

15. The non-transitory computer-readable medium of claim 13, wherein the instructions further cause the programmable processor to:

create an entry associated with the fragment flow in a flow table;

in response to receiving the one or more fragments of the fragment flow that does not include the first fragment of the fragment flow that includes the indication of the destination port of the network packet, transition the fragment flow to a buffer state by updating the entry for the fragment flow in the flow table to indicate that the fragment flow is in the buffer state, wherein the buffer state indicates that the network device has not yet received the indication of the destination port of the network packet; and in response to receiving the first fragment of the fragment flow that includes the indication of the destination port of the network packet, transition the fragment flow from the buffer state to an encapsulation state by updating the entry for the fragment flow in the flow table to indicate that the fragment flow is in the encapsulation state, wherein the encapsulation state indicates that the network device is able to encapsulate fragments of the fragment flow based at least in part on the destination port.

16. The non-transitory computer-readable medium of claim 13, wherein the instructions further cause the programmable processor to:

determine that the one or more fragments of the fragment flow for the network packet does not include the first fragment of the fragment flow; and determine whether the first fragment of the fragment flow includes the indication of the destination port of the network packet.

17. The non-transitory computer-readable medium of claim 13, wherein the instructions further cause the programmable processor to:

encapsulate each of the one or more fragments of the fragment flow and the first fragment of the fragment flow using mapping of address and port with encapsulation (MAP-E).

18. The non-transitory computer-readable medium of claim 13, wherein:

the first type of network packet is an Internet Protocol version 4 (IPv4) network packet;

the second type of network packet is an Internet Protocol version 6 (IPv6) network packet;

the first network is an IPv4 network; and the second network is an IPv6 network.

* * * * *